US012043985B2

(12) United States Patent
Teranishi et al.

(10) Patent No.: US 12,043,985 B2
(45) Date of Patent: Jul. 23, 2024

(54) STEERING DEVICE, STEERING SYSTEM, AND WORK VEHICLE

(71) Applicant: KOMATSU LTD., Tokyo (JP)

(72) Inventors: Yuichi Teranishi, Tokyo (JP); Yuita Takenaka, Tokyo (JP)

(73) Assignee: KOMATSU LTD., Tokyo (JP)

(*) Notice: Subject to any disclaimer, the term of this patent is extended or adjusted under 35 U.S.C. 154(b) by 958 days.

(21) Appl. No.: 17/045,513

(22) PCT Filed: Jul. 16, 2019

(86) PCT No.: PCT/JP2019/027876
§ 371 (c)(1),
(2) Date: Oct. 6, 2020

(87) PCT Pub. No.: WO2020/036034
PCT Pub. Date: Feb. 20, 2020

(65) Prior Publication Data
US 2021/0156117 A1 May 27, 2021

(30) Foreign Application Priority Data

Aug. 13, 2018 (JP) ................. 2018-152423

(51) Int. Cl.
E02F 9/22 (2006.01)
B62D 1/12 (2006.01)
(Continued)

(52) U.S. Cl.
CPC ............ *E02F 9/225* (2013.01); *B62D 1/12* (2013.01); *B62D 5/065* (2013.01); *B62D 5/09* (2013.01); *B62D 5/26* (2013.01); *B62D 12/00* (2013.01); *B62D 15/021* (2013.01); *E02F 9/0841* (2013.01); *E02F 9/2004* (2013.01); *E02F 9/2087* (2013.01); *E02F 9/2228* (2013.01); *E02F 9/2285* (2013.01); *E02F 3/283* (2013.01); *E02F 9/2292* (2013.01)

(58) Field of Classification Search
CPC . B62D 5/09; B62D 5/18; B62D 5/065; B62D 5/26; B62D 5/06; B62D 12/00;
(Continued)

(56) References Cited

U.S. PATENT DOCUMENTS 4,517,856 A 5/1985 Schafer et al.
6,202,501 B1 3/2001 Ikari
(Continued)

FOREIGN PATENT DOCUMENTS

CN 2165032 Y 5/1994
CN 205365243 U 7/2016
(Continued)

OTHER PUBLICATIONS

The International Search Report for the corresponding international application No. PCT/JP2019/027876, issued on Oct. 1, 2019.
(Continued)

Primary Examiner — Anne Marie M Boehler
(74) Attorney, Agent, or Firm — Global IP Counselors, LLP

(57) ABSTRACT

A steering device for operating a work vehicle includes a support part, a base member rotatably supported by the support part, a lever rotatably supported by the support part or the base member, a biasing member and a transmission mechanism connecting part. The biasing member is interposed between the lever and the base member to bias the lever to a predetermined position with respect to the base member. The transmission mechanism connecting part configured to be connected to a transmission mechanism configured to transmit rotation based on a rotation angle of a steering shaft of the work vehicle to the base member. A restriction part may restrict rotation of the lever when an angle of the lever with respect to the base member reaches a predetermined angle.

20 Claims, 20 Drawing Sheets

(51) Int. Cl.
*B62D 5/065* (2006.01)
*B62D 5/09* (2006.01)
*B62D 5/26* (2006.01)
*B62D 12/00* (2006.01)
*B62D 15/02* (2006.01)
*E02F 9/08* (2006.01)
*E02F 9/20* (2006.01)
*E02F 3/28* (2006.01)

(58) Field of Classification Search
CPC ........ B62D 12/02; E02F 9/225; E02F 9/2228; E02F 9/2004; E02F 9/2087; E02F 9/0841; E02F 9/2285; E02F 9/2296; E02F 9/2292
See application file for complete search history.

(56) References Cited

U.S. PATENT DOCUMENTS

| | | |
|---|---|---|
| 2007/0112473 A1 | 5/2007 | Ueno et al. |
| 2008/0162000 A1 | 7/2008 | Dattilo et al. |
| 2018/0037255 A1 | 2/2018 | Takenaka et al. |
| 2018/0305896 A1* | 10/2018 | Roske ................ E02F 9/225 |
| 2019/0017245 A1 | 1/2019 | Takenaka et al. |
| 2019/0187742 A1* | 6/2019 | Hettegger ............ G05G 5/03 |

FOREIGN PATENT DOCUMENTS

| | | |
|---|---|---|
| CN | 107406100 A | 11/2017 |
| FR | 3051953 A1 | 12/2017 |
| JP | 48-87728 U | 10/1973 |
| JP | 52-131582 U | 10/1977 |
| JP | 11-321664 A | 11/1999 |
| JP | 2010-39910 A | 2/2010 |
| JP | 2010-515150 A | 5/2010 |
| JP | 2017-213994 A | 12/2017 |
| WO | 2005/056357 A1 | 6/2005 |

OTHER PUBLICATIONS

The Office Action for the corresponding Chinese application No. 201980031739.X, issued on May 27, 2022.
The extended European search report for the corresponding European application No. 19849483.3, issued on Dec. 10, 2021.

* cited by examiner

STEERING DEVICE, STEERING SYSTEM, AND WORK VEHICLE

CROSS-REFERENCE TO RELATED APPLICATIONS

This application is a U.S. National stage application of International Application No. PCT/JP2019/027876, filed on Jul. 16, 2019. This U.S. National stage application claims priority under 35 U.S.C. § 119(a) to Japanese Patent Application No. 2018-152423, filed in Japan on Aug. 13, 2018, the entire contents of which are hereby incorporated herein by reference.

BACKGROUND

Field of the Invention

The present invention relates to a steering device, a steering system, and a work vehicle.

Background Information

As an articulated work vehicle, there is disclosed a configuration in which a steering angle is changed by controlling a flow rate of oil supplied to a hydraulic actuator arranged across a front frame and a rear frame (for example, see Japanese Patent Laid-open No. H11-321664).

The work vehicle illustrated in Japanese Patent Laid-open No. H11-321664 is provided with a steering valve that adjusts the flow rate of oil supplied to the hydraulic actuator according to the input pilot pressure and a pilot valve that adjusts the pilot pressure supplied to the steering valve.

The pilot valve is provided with an operation input shaft and a feedback input shaft that are relatively rotatable. The operation input shaft is connected to the joystick lever by a link mechanism, and rotates according to the rotation angle of the joystick lever. Further, the feedback input shaft is connected to the front frame by a link mechanism and rotates according to the change of the steering angle. The operation input shaft is biased to a predetermined position with respect to the feedback input shaft, and a counterforce is applied to the operation of the joystick lever by the operator according to the rotational position of the work vehicle.

When the operator operates the joystick lever against the counterforce, the operation input shaft of the pilot valve rotates, and the pilot pressure which is inputted to the steering valve is adjusted according to the difference between the rotation angle of the operation input shaft and the rotation angle of the feedback input shaft. The flow rate of oil supplied from the steering valve to the hydraulic actuator is changed according to the adjusted pilot pressure, and the steering angle is changed.

SUMMARY

However, in the configuration of Japanese Patent Laid-open No. H11-321664 described above, the pilot valve is interposed in the link mechanism between the joystick lever and the front frame, and the biasing member provided on the pilot valve and the stroke end stop part of the pilot valve cause the joystick lever to be applied the counterforce.

Therefore, the layout of the link mechanism in the cab is restricted from the viewpoint of securing the installation place of the pilot valve.

An object of the present invention is to provide a steering device, a steering system, and a work vehicle capable of improving the flexibility of layout.

A steering device according to the invention comprises a support part, a base member, a lever, a biasing member, and a transmission mechanism connecting part. The base member is rotatably supported by the support part. The lever is rotatably supported by the support part or the base member. The biasing member is interposed between the lever and the base member and biases the lever to a predetermined position with respect to the base member. The transmission mechanism connecting part is connected to a transmission mechanism including a link that transmits the rotation based on the rotation angle of the steering shaft of the work vehicle to the base member.

According to the present invention, it is possible to provide a steering device, a steering system, and a work vehicle capable of improving the flexibility of layout.

DETAILED DESCRIPTION OF EMBODIMENT(S)

The following is an explanation of a wheel loader as an example of a work vehicle according to the present invention with reference to the drawings.

Embodiment 1

A wheel loader 1 according to a first embodiment according to the present invention is explained hereinbelow.

Configuration

Outline of Configuration of Wheel Loader

Figure 1:
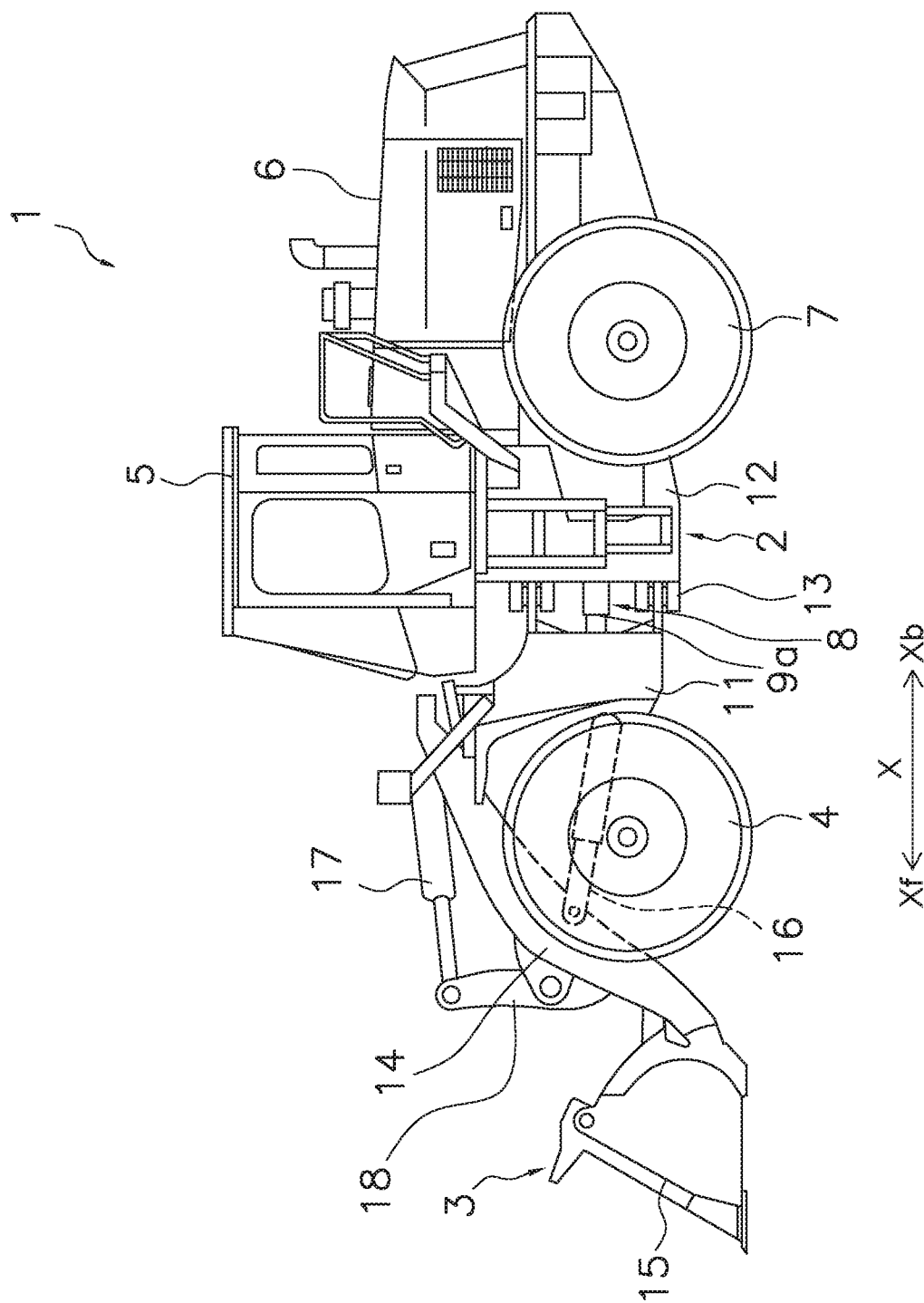
FIG. 1 is a side view illustrating a wheel loader of a first embodiment according to the present invention.

FIG. 1 is a schematic view of a configuration of the wheel loader 1 of the present embodiment. The wheel loader 1 of the present embodiment is provided with a vehicle body frame 2, a work implement 3, a pair of front tires 4, a cab 5, an engine room 6, a pair of rear tires 7, and a steering system 8, steering cylinders 9a and 9b (refer to FIG. 3), and a transmission mechanism 10 (see FIG. 3).

In the following explanations, "front," "rear," "right," "left," "up," and "down" indicate directions relative to a state of looking forward from the driver's seat. "Vehicle width direction" and "left-right direction" have the same meaning. In FIG. 1, "X" indicates the front-rear direction and "Xf" is used to indicate the forward direction and "Xb" is used to indicate the rearward direction. In addition, the left-right direction is indicated with "Y," and "Yr is used to indicate the right direction and "Yl" is used to indicate the left direction in the following drawings.

The wheel loader 1 is able to carry out work such as earth and sand loading by using the work implement 3.

The vehicle body frame 2 is a so-called articulated type and includes a front frame 11, a rear frame 12, and a coupling shaft part 13. The front frame 11 is arranged in front of the rear frame 12. The front frame 11 corresponds to an example of a second frame, and the rear frame 12 corresponds to an example of a first frame. The coupling shaft part 13 corresponds to an example of the steering shaft, is provided in the center in the vehicle width direction, and couples the front frame 11 and the rear frame 12 to each other in a manner that allows swinging. The pair of front tires 4 are attached to the left and right of the front frame 11. The pair of rear tires 7 are attached to the left and right of the rear frame 12.

The work implement 3 is driven by hydraulic fluid from a work implement pump which is not illustrated. The work implement 3 includes a boom 14, a bucket 15, a lift cylinder 16, and a bucket cylinder 17. The boom 14 is mounted onto the front frame 11. The bucket 15 is attached to the tip of the boom 14.

The lift cylinder 16 and the bucket cylinder 17 are hydraulic cylinders. One end of the lift cylinder 16 is attached to the front frame 11 and the other end of the lift cylinder 16 is attached to the boom 14. The boom 14 swings up and down due to the extension and contraction of the lift cylinder 16. One end of the bucket cylinder 17 is attached to the front frame 11 and the other end of the bucket cylinder 17 is attached to the bucket 15 via a bell crank 18. The bucket 15 swings up and down due to the extension and contraction of the bucket cylinder 17.

The cab 5 is disposed on the rear frame 12. A joystick lever 41 (see FIG. 2 below) for performing steering operations, an lever for operating the work implement 3, and various display devices are arranged inside the cab 5. The engine room 6 is arranged to the rear of the cab 5 and on the rear frame 12 and contains an engine.

Figure 2:
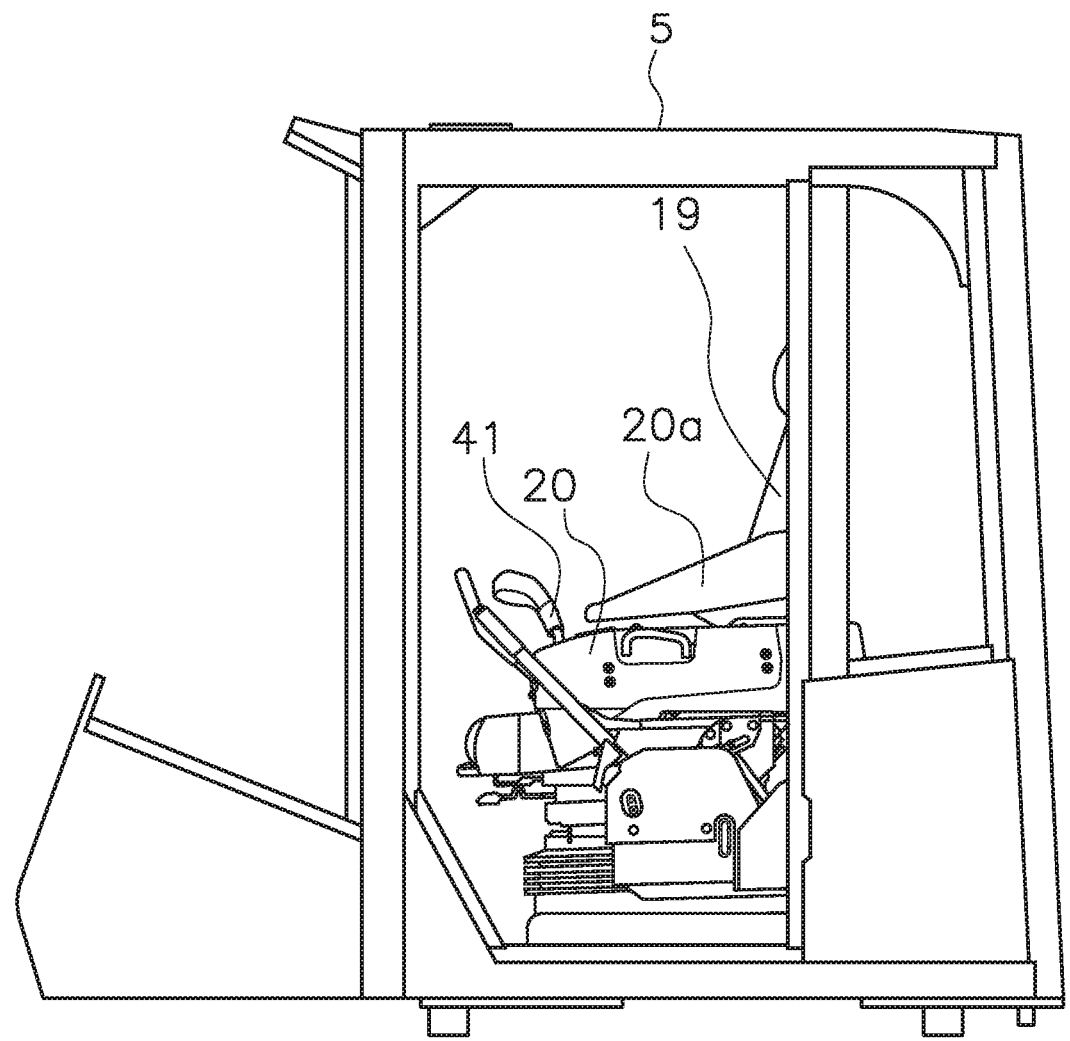
FIG. 2 is a side view illustrating the vicinity of the cab in FIG. 1.

FIG. 2 is a partial side view of the cab 5. An operator's seat 19 is provided in the cab 5 and a console box 20 is arranged to the side of the operator's seat. An arm rest 20a is arranged on the upper side of the console box 20. The joystick lever 41 is arranged upward from the front end of the console box 20. The joystick lever 41 corresponds to an example of a lever.

Figure 3:
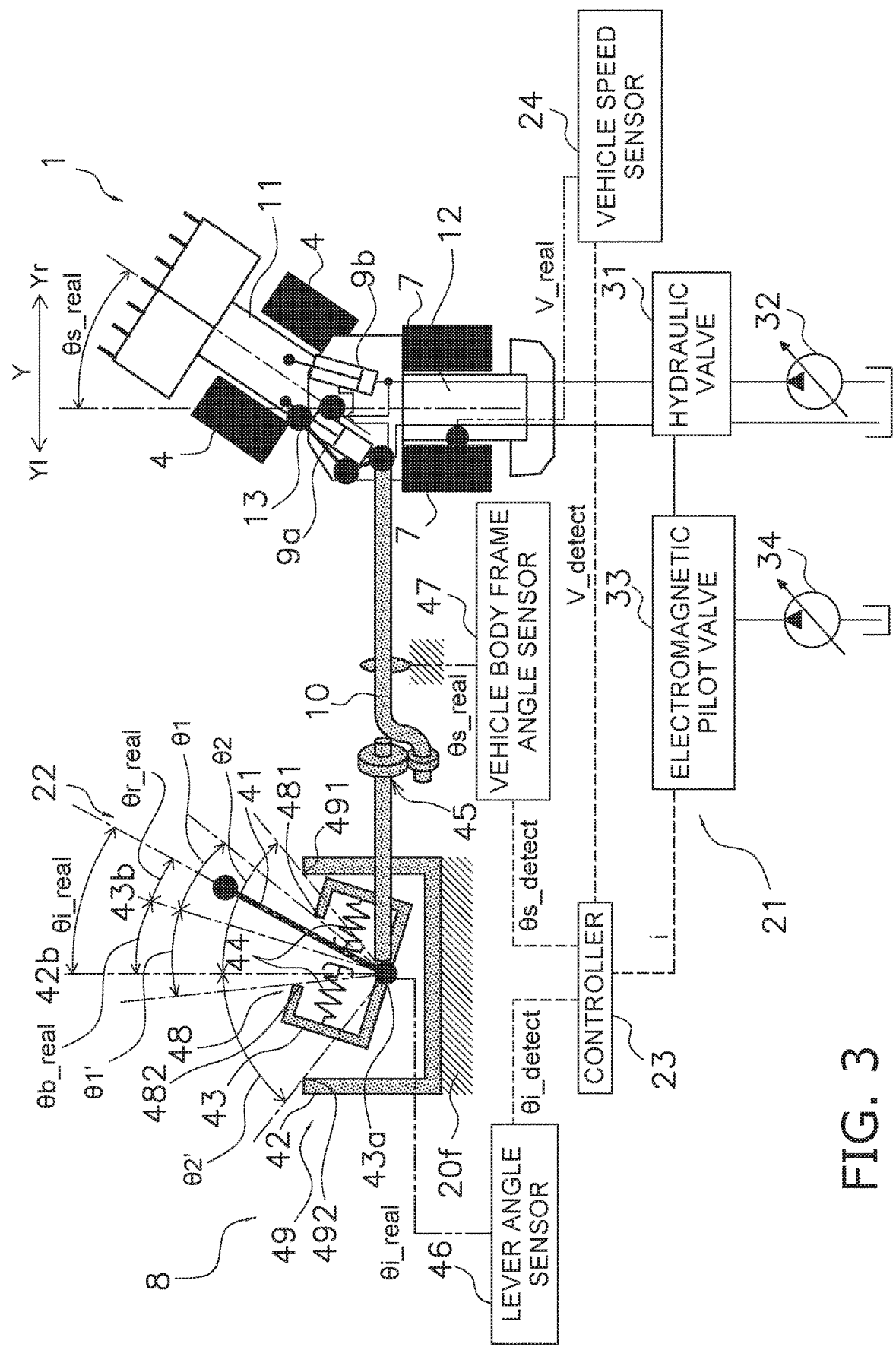
FIG. 3 is a configuration view illustrating a steering system in FIG. 1.

FIG. 3 is a configuration view illustrating the steering system 8. The steering system 8 changes the flow rate of oil supplied to the steering cylinders 9a and 9b, thereby changing the vehicle body frame angle of the front frame 11 with respect to the rear frame 12 and changing the traveling direction of the wheel loader 1. The steering cylinders 9a and 9b correspond to an example of an actuator. The steering cylinders 9a and 9b correspond to an example of hydraulic cylinders.

The pair of steering cylinders 9a and 9b are driven by hydraulic pressure. The pair of steering cylinders 9a and 9b are arranged side by side on the left and right sides in the vehicle width direction with the coupling shaft part 13 interposed therein. The steering cylinder 9a is arranged on the left side of the coupling shaft part 13. The steering cylinder 9b is arranged on the right side of the coupling shaft part 13. One end of each of the steering cylinders 9a and 9b is attached to the front frame 11 and the other end each is attached to the rear frame 12.

When the steering cylinder 9a extends and the steering cylinder 9b contracts due to hydraulic pressure from the belowmentioned steering system 8, an actual vehicle body frame angle θs_real is changed and the vehicle turns to the right. When the steering cylinder 9a contracts and the steering cylinder 9b extends due to hydraulic pressure from the steering system 8, the actual vehicle body frame angle θs_real is changed and the vehicle turns to the left. In the present embodiment, the actual vehicle body frame angle θs_real when the front frame 11 and the rear frame 12 are arranged in the front-rear direction is set to zero, the right side is a positive value, and the left side is a negative value.

Steering System 8

The steering system 8 has an adjusting mechanism 21, a steering device 22, a controller 23, and a vehicle speed sensor 24. The adjusting mechanism 21 adjusts the drive output of the steering cylinders 9a and 9b. The steering device 22 has a joystick lever 41 and the like, and an operator inputs a rotation instruction angle for steering the wheel loader 1 with the steering device 22. The controller 23 instructs the adjusting mechanism 21 to adjust the drive output of the steering cylinders 9a and 9b based on the steering rotation instruction angle input to the steering device 22. The vehicle speed sensor 24 corresponds to an example of a traveling speed detection part, detects the vehicle speed V of the wheel loader 1, and transmits the vehicle speed V as a detection signal to the controller 23.

In FIG. 3, transmission of signals based on electricity is represented by the dotted lines, and transmission based on hydraulic pressure is represented by solid lines. Further, detection by sensors is represented by a two-dot chain line.

Adjusting Mechanism 21

The adjusting mechanism 21 adjusts the flow rate of oil supplied to the steering cylinders 9a and 9b. The adjusting mechanism 21 has a hydraulic valve 31, a main pump 32, an electromagnetic pilot valve 33, and a pilot pump 34. The hydraulic valve corresponds to an example of the adjusting part.

The hydraulic valve 31 is a flow rate adjusting valve that adjusts the flow rate of oil supplied to the steering cylinders 9a and 9b according to the input pilot pressure. For the hydraulic valve 31, for example, a spool valve is used. The main pump 32 supplies the hydraulic fluid that operates the steering cylinders 9a and 9b to the hydraulic valve 31.

The hydraulic valve 31 has an obturating element (not illustrated) that can be moved to the left steering position, the neutral position, and the right steering position. When the obturating element of the hydraulic valve 31 is arranged at the left steering position, the steering cylinder 9a contracts and the steering cylinder 9b extends, the actual vehicle body frame angle θs_real decrease, and the vehicle body turns to the left.

When the obturating element of the hydraulic valve 31 is arranged at the right steering position, the steering cylinder 9b contracts and the steering cylinder 9a extends, the actual vehicle body frame angle θs_real increases, and the vehicle body turns to the right. When the obturating element of the hydraulic valve 31 is arranged at the neutral position, the actual vehicle body frame angle θs_real does not change.

The electromagnetic pilot valve 33 is a flow rate adjusting valve that adjusts the flow rate or pressure of pilot hydraulic pressure supplied to the hydraulic valve 31 in accordance with a command from the controller 23. The pilot pump 34 supplies hydraulic fluid that operates the hydraulic valve 31 to the electromagnetic pilot valve 33. The electromagnetic pilot valve 33 is, for example, a spool valve or the like, and is controlled according to a command from the controller 23.

The electromagnetic pilot valve 33 has an obturating element (not illustrated) movable to the left pilot position, the neutral position, and the right pilot position. When the obturating element of the electromagnetic pilot valve 33 is arranged at the left pilot position, the hydraulic valve 31 is in the left steering position. When the obturating element of the electromagnetic pilot valve 33 is arranged at the right pilot position, the hydraulic valve 31 is in the right steering position. When the obturating element of the electromagnetic pilot valve 33 is arranged in the neutral position, the hydraulic valve 31 is in the neutral position.

As described above, by controlling the pilot pressure or the pilot flow rate from the electromagnetic pilot valve 33 in accordance with the command from the controller 23, the hydraulic valve 31 is controlled and the steering cylinders 9a, 9b are controlled.

Steering Device 22

As illustrated in FIG. 3, the steering device 22 has a joystick lever 41, a support part 42, a base member 43, a biasing member 44, a transmission mechanism connecting part 45, a lever angle sensor 46, and a vehicle body frame angle sensor 47, and a restriction part 48. The lever angle sensor 46 corresponds to an example of a first lever angle sensor. The vehicle body frame angle sensor 47 corresponds to an example of a vehicle body steering angle sensor.

The support part 42 is fixed to a frame 20f of the console box 20. The support part 42 may be a part of the frame of the console box 20.

The base member 43 is rotatably supported by the support part 42. The base member 43 has, for example, a shaft 43a as illustrated in FIG. 3, and the shaft 43a is rotatably supported by the support part 42. This allows the base member 43 to rotate with respect to the support part 42 about the shaft 43a. Further, the base member 43 can be configured to be rotatable with respect to the support part 42 by the configuration in which the support part 42 has a shaft, the through hole is formed in the base member 43, and the shaft of the support part 42 is inserted through the through hole of the base member 43.

The joystick lever 41 is rotatably arranged with respect to the base member 43 or the support part 42. The joystick lever 41 is configured to be rotatable with respect to the base member 43, for example, by forming a through hole at the proximal end portion of the joystick lever and inserting a shaft 43a into the through hole. Further, the support part 42 has a shaft, and the shaft is inserted into the through hole at the proximal end portion the joystick lever 41, whereby the joystick lever 41 can be configured to be rotatable with respect to the support part 42.

The biasing member 44 is a spring member and is interposed between the joystick lever 41 and the base member 43. The biasing member 44 biases the joystick lever 41 to a base reference position 43b with respect to the base member 43. The joystick lever 41 applies a counterforce to both the case where the joystick lever 41 is rotated in the right direction from the base reference position 43b and the case where the joystick lever 41 is rotated in the left direction from the base reference position 43b.

When the operator is not gripping the joystick lever 41, the joystick lever 41 is positioned at the base reference position 43b by the biasing force from the left and right rotation directions.

The restriction part 48 is provided on the base member 43. The restriction part 48 has contact parts 481 and 482. The contact parts 481 and 482 restrict the rotation range of the joystick lever 41 with respect to the base member 43 within a predetermined angle range. When the longitudinal direction of the joystick lever 41 is arranged at the base reference position 43b, the rotation angle of the joystick lever 41 with respect to the base member 43 is set to zero. The case where the joystick lever 41 is rotated in the right direction with respect to the base member 43 is represented by plus, and the case where the joystick lever 41 is rotated in the left direction with respect to the base member 43 is represented by minus. The actual relative angle θr_real of the joystick lever 41 with respect to the base member 43 is illustrated in FIG. 3.

When the joystick lever 41 is rotated in the right direction Yr with respect to the base member 43 and the actual relative angle θr_real of the joystick lever 41 with respect to the base member 43 reaches θ1 (a positive value), the joystick lever 41 comes into contact with the contact part 481 of the base member 43, and the joystick lever 41 cannot be rotated to the right side anymore. Further, when the joystick lever 41 is rotated in the left direction with respect to the base member 43 and θr_real reaches θ1' (negative value), the joystick lever 41 comes into contact with the contact part 482 of the base member 43, and the joystick lever 41 cannot be rotated to the left side anymore. That is, the joystick lever 41 is set to be rotatable with respect to the base member 43 within the angle range of θ1' to θ1. The predetermined angles θ1' and θ1 correspond to the catch-up angle. The predetermined angles θ1 and θ1' are set to 10 degrees and −10 degrees, for example. The absolute value of the predetermined angle θ1 and the absolute value of the predetermined angle θ1' may be the same value or may be different.

Further, the joystick lever 41 is restricted not only by the base member 43 but also by the support part 42. The support part 42 has a contact part 49 with which the joystick lever 41 abuts, and the contact part 49 has a right contact part 491 and a left contact part 492. The support part 42 restricts the base member 43 within a predetermined angle range of θ2' (negative value) to θ2 (positive value) with respect to a support reference position 42b. The values of the predetermined angles θ2' and θ2 are set to, for example, −20 degrees and 20 degrees. The absolute value of the predetermined angle θ2' and the absolute value of the predetermined angle θ2 may have the same value or different values.

The transmission mechanism connecting part 45 is connected to the transmission mechanism 10 described later, and the information of the actual vehicle body frame angle θs_real that is the rotation angle of the front frame 11 with respect to the rear frame 12 is mechanically input to the transmission mechanism connecting part 45. The transmission mechanism connecting part 45 is provided on the base member 43. The transmission mechanism connecting part 45 is, for example, a gear member fixed to the base member 43, and meshes with a gear of the transmission mechanism 10. As a result, the rotation angle based on the actual vehicle body frame angle θs_real is transmitted to the base member 43.

Figure 4:
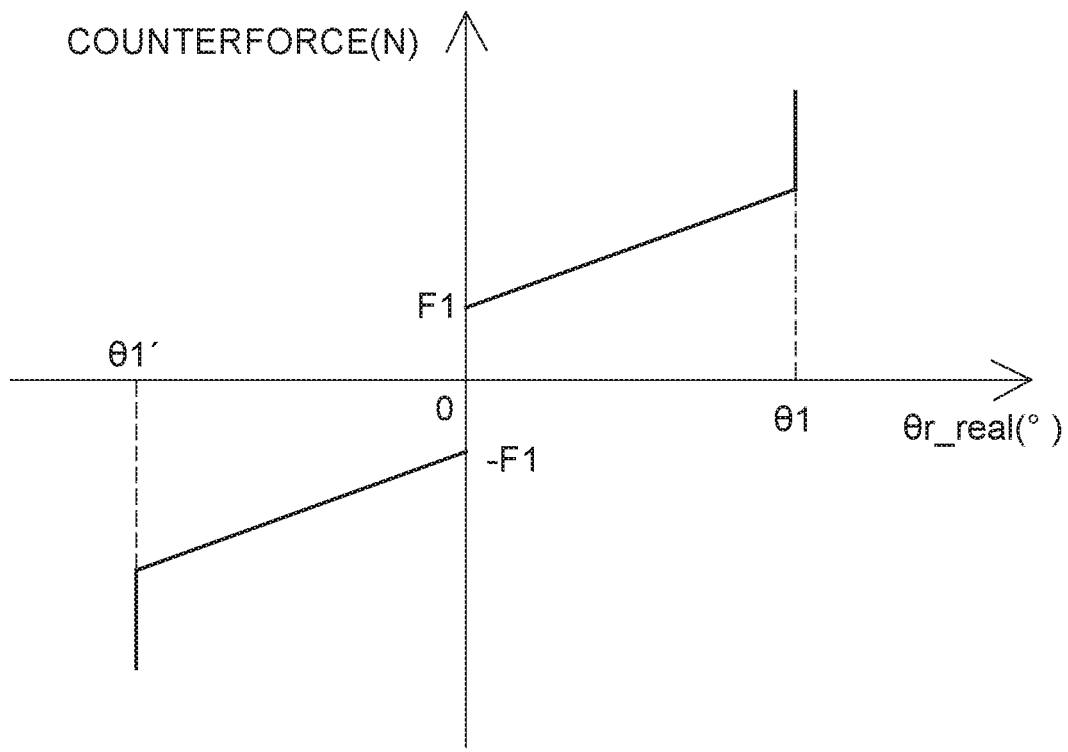
FIG. 4 is a view illustrating a counterforce of a spring member with respect to a difference between a lever angle and a base plate angle.

FIG. 4 is a view illustrating a counterforce applied to the actual relative angle θr_real of the joystick lever 41 with respect to the base member 43. In FIG. 4, the horizontal axis represents the actual relative angle θr_real of the joystick lever 41 with respect to the base member 43, and the vertical axis represents the counterforce. A positive value on the horizontal axis (relative angle) indicates the case where the joystick lever 41 is rotated in the right direction with respect to the base member 43, and a negative value on the horizontal axis (relative angle) indicates the case where the joystick lever 41 is rotated in the left direction with respect to the base member 43. A positive value on the vertical axis (counterforce) indicates a case where a counterforce is applied in the left rotation direction, and a negative value on the vertical axis (counterforce) indicates a case where a counterforce is applied in the right rotation direction.

While the actual relative angle θr_real is 0° to θ1 or 0° to θ1', a counterforce is applied by the spring characteristic of the biasing member 44. An initial counterforce, that is, a counterforce of F1 or more is applied when the joystick lever 41 is operated from the base reference position 43b. As the absolute value of the actual relative angle θr_real increases, the counterforce applied to the operation of the joystick lever 41 also increases. When the actual relative angle θr_real reaches θ1 or θ1', the counterforce increases linearly. This is because the joystick lever 41 comes into contact with the contact parts 481 and 482 of the base member 43.

The lever angle sensor 46 is composed of, for example, a potentiometer, and detects the actual lever angle θi_real of the joystick lever 41 with respect to the support part 42 as a lever angle detection value θi_detect. The detection value θi_detect of the lever angle corresponds to an example of the first detection value.

Here, the support reference position 42b of the joystick lever 41 with respect to the support part 42 is illustrated in FIG. 3. In a state where the longitudinal direction of the joystick lever 41 is maintained at the support reference position 42b, the adjusting mechanism 21 controls the actual vehicle body frame angle θs_real to be 0°, and the front frame 11 becomes in a state of being arranged in the front-rear direction with respect to the rear frame 12. When the joystick lever 41 is arranged at the support reference position 42b, the rotation angle of the joystick lever 41 with respect to the support part 42 is zero, and the case where the joystick lever 41 is rotated in the right direction with respect to the support part 42 is represented by plus, and the case where the joystick lever 41 is rotated in the left direction with respect to the support part 42 is a minus. Control is executed by the controller 23 so that the actual vehicle body frame angle θs_real becomes a value corresponding to the actual lever angle θi_real from the support reference position 42b of the joystick lever 41. The actual base angle of the base member 43 with respect to the support part 42 is θb_real. The actual base angle θb_real corresponds to the rotation angle of the base reference position 43b of the base member 43 from the support reference position 42b. Further, when the base reference position 43b is arranged at the support reference position 42b, the rotation angle of the base member 43 with respect to the support part 42 is set to zero, and the case where the base member 43 is rotated in the right direction with respect to the support part 42 is represented by plus, and the case where the base member 43 is rotated in the left direction with respect to the support part 42 is represented by minus.

The vehicle body frame angle sensor 47 detects the actual vehicle body frame angle θs_real as a detection value θs_detect of the vehicle body frame angle. The detection value θs_detect of the vehicle body frame angle corresponds to an example of the second detection value. The vehicle body frame angle sensor 47 is arranged in the vicinity of the coupling shaft part 13 arranged between the steering cylinders 9a and 9b, or on the shaft 43a of the base member 43, or in the transmission mechanism 10 described later. The vehicle body frame angle sensor 47 is composed of, for example, a potentiometer, and the detection value θs_detect of the detected body frame angle is sent to the controller 23 as a detection signal.

Further, each of the steering cylinders 9a and 9b may be provided with a cylinder stroke sensor that detects a stroke of the cylinder, and the detection values of these cylinder stroke sensors may be sent to the controller 23 to detect the detection value θs_detect of the vehicle body frame angle.

Further, by the transmission mechanism 10 described later, the vehicle body frame angle θs_real and the base angle θb_real, which is the rotation angle of the base member with respect to the support part 42, have a corresponding positional relationship. Therefore, the vehicle body frame angle sensor 47 may be provided on the shaft 43a. This is because the vehicle body frame angle can be detected by detecting the rotation angle of the base member 43 with respect to the support part 42.

Figure 5A:
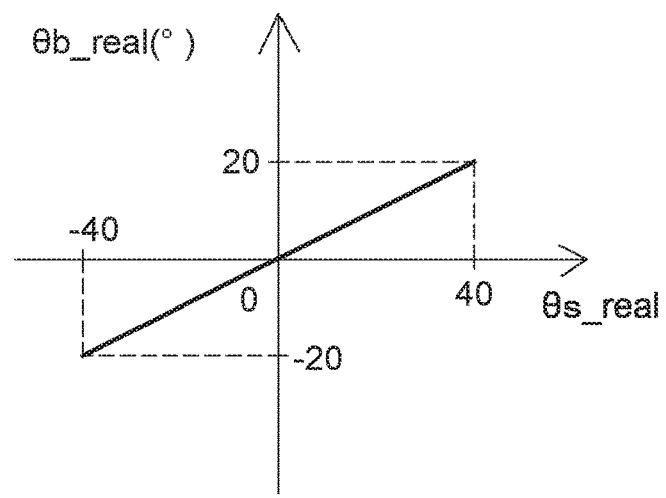
FIG. 5A is a view illustrating an example of a correspondence relationship between a vehicle body frame angle and a base angle.
Figure 5B:
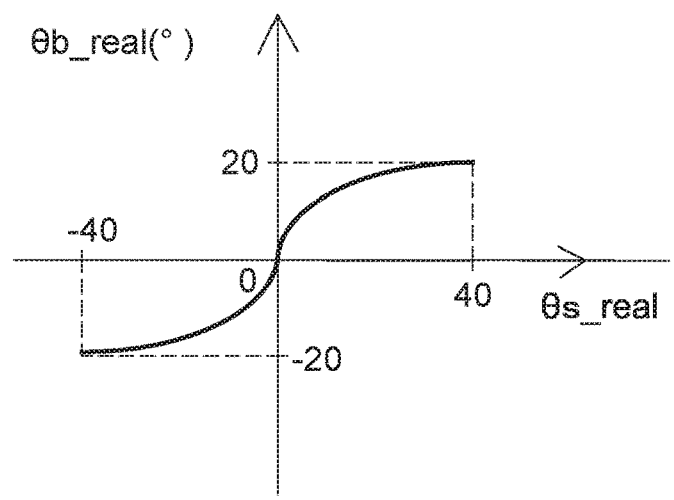
FIG. 5B is a view illustrating an example of a correspondence relationship between a vehicle body frame angle and a base angle.

FIG. 5A and FIG. 5B show an example of the correspondence relationship between the vehicle body frame angle θs_real and the base angle θb_real. In the example of FIGS. 5A and 5B, the base frame angle θb_real can have a width of ±20° while the vehicle body frame angle θs_real has a value of ±40°.

In FIG. 5A, the base angle θb_real has a proportional relationship with the vehicle body frame angle θs_real, and when the vehicle body frame angle θs_real increases, the base angle θb_real also increases.

In FIG. 5B, the graph is a curve, and when the absolute value of the vehicle body frame angle θs_real is small, the change in the base angle θb_real when the vehicle body frame angle θs_real changes is large. When the absolute value of the vehicle body frame angle θs_real increases, the change in the base angle θb_real when the body frame angle θs_real changes decreases.

Figure 6A:
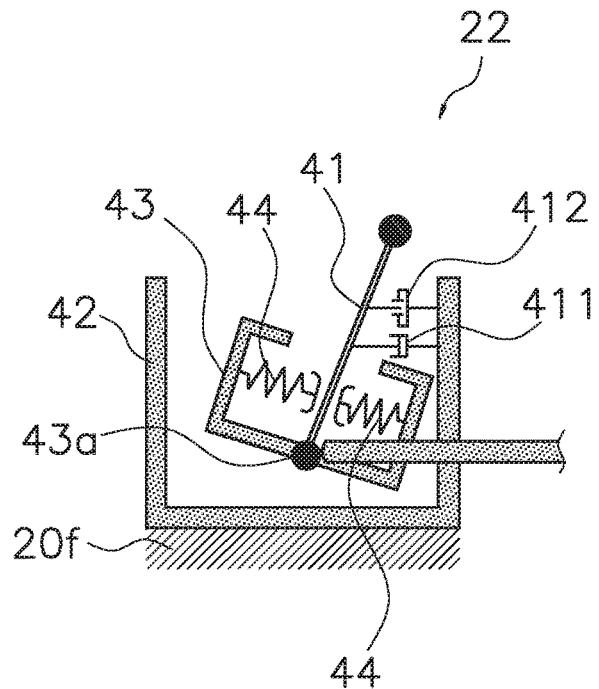
FIG. 6A is a configuration view illustrating a modified example of the steering device.
Figure 6B:
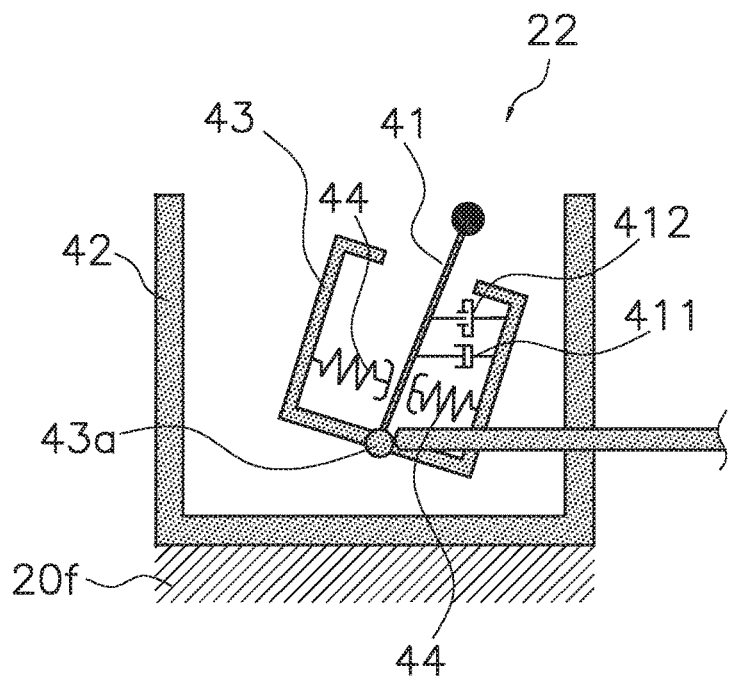
FIG. 6B is a configuration view illustrating a modified example of the steering device.

Further, a damper, a friction, or both a damper and a friction may be provided between the joystick lever 41 and the support part 42 or between the joystick lever 41 and the base member 43. FIG. 6A shows a configuration in which a damper 411 and a friction 412 are provided between the joystick lever 41 and the support part 42. Further, FIG. 6B shows a configuration in which a damper 411 and a friction 412 are provided between the joystick lever 41 and the base member 43. The damper 411 corresponds to an example of a damping member, and the friction 412 corresponds to an example of a friction member.

Controller 23

The controller 23 has a processor and a memory. The following processing is performed by using the processor.

The detection value θi_detect of the lever angle sensor 46, the detection value θs_detect of the vehicle body frame angle sensor 47, and the vehicle speed V_detect detected by the vehicle speed sensor 24 are input to the controller 23. The controller 23 outputs the electromagnetic pilot valve control current output I on the basis of these values to control the electromagnetic pilot valve 33. The electromagnetic pilot valve control current output i corresponds to an example of the adjustment signal.

Figure 7:
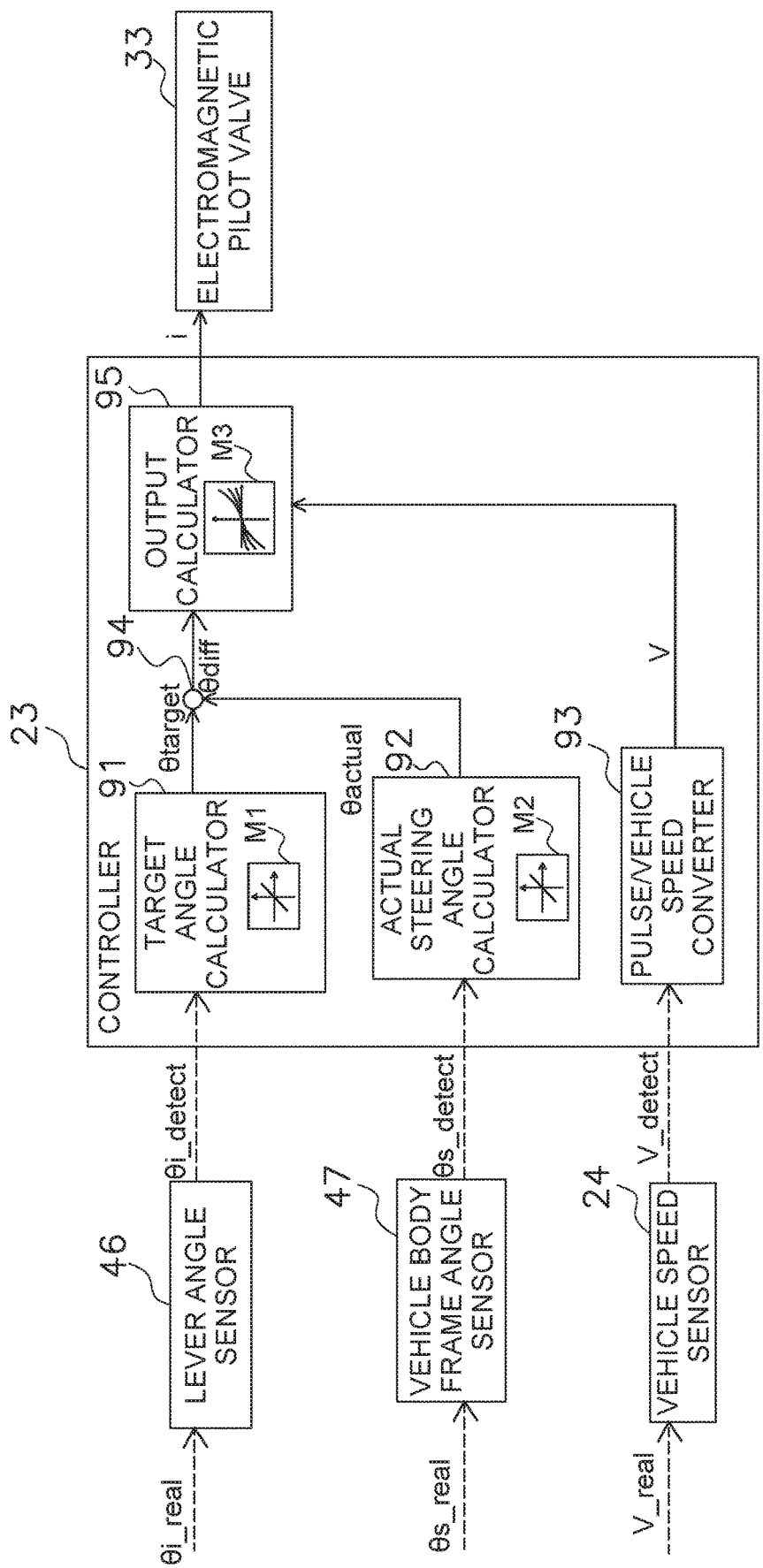
FIG. 7 is a block diagram illustrating input/output and calculation of the controller in FIG. 3.

Here, FIG. 7 shows a block diagram of the input/output and the operation of the controller 23. The controller 23 has a target angle calculator 91, an actual steering angle calculator 92, a pulse/vehicle speed converter 93, a difference calculator 94, and an output calculator 95.

The detection value θi_detect of the lever angle is input to the controller 23 from the lever angle sensor 46, and the target angle calculator 91 calculates the target angle θtarget by using the map M1. Further, the detected steering angle value θs_detect from the vehicle body frame angle sensor 47 is input to the controller 23, and the actual steering angle calculator 92 calculates the actual steering angle θactual by using the map M2. The detection value V_detect of the vehicle speed is input to the controller 23 from the vehicle speed sensor 24. The pulse/vehicle speed converter 93 converts the input pulse into a vehicle speed and calculates a vehicle speed signal V.

The difference calculator 94 calculates the difference θdiff between the target angle θtarget and θactual. Then, the output calculator 95 calculates the electromagnetic pilot valve control current output i from the difference θdiff and the vehicle speed signal V by using the map M3, and outputs the electromagnetic pilot valve control current output i to the electromagnetic pilot valve 33. The maps M1 to M3 are stored in the storage part of the controller 23.

Figure 8A:
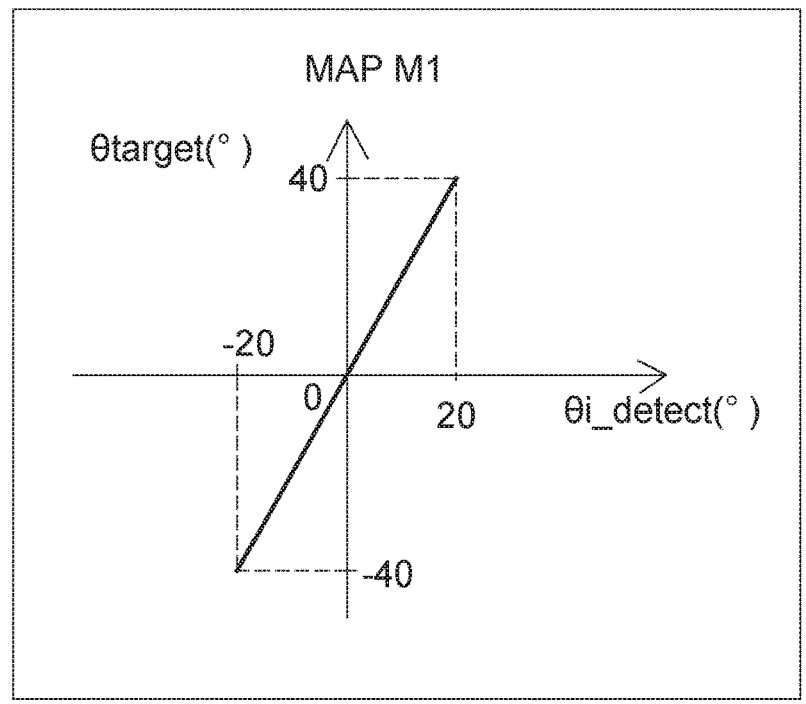
FIG. 8A is a view illustrating a map in FIG. 7.
Figure 8B:
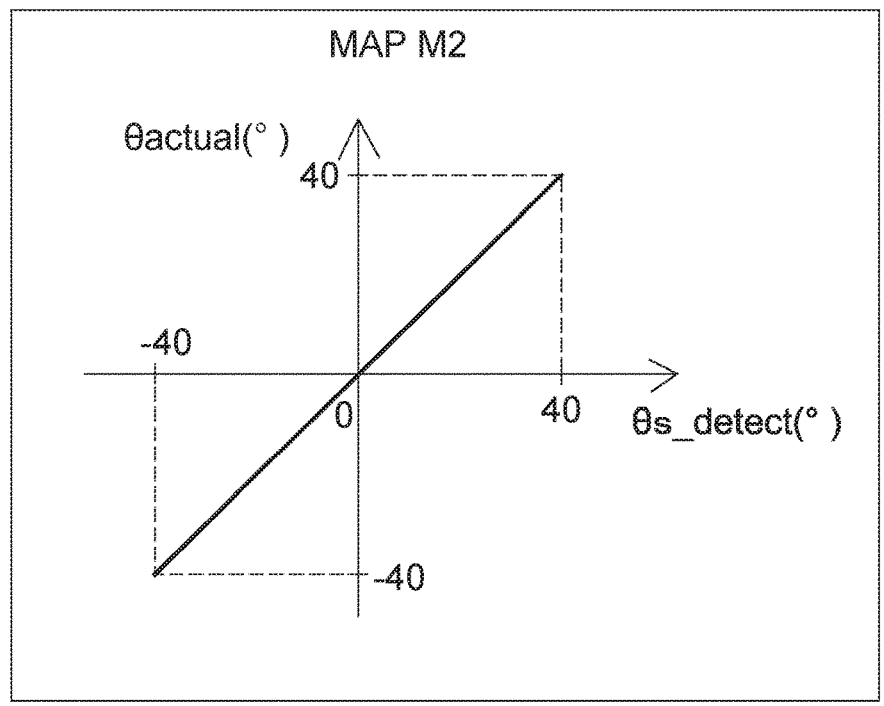
FIG. 8B is a view illustrating a map of FIG. 7.
Figure 8C:
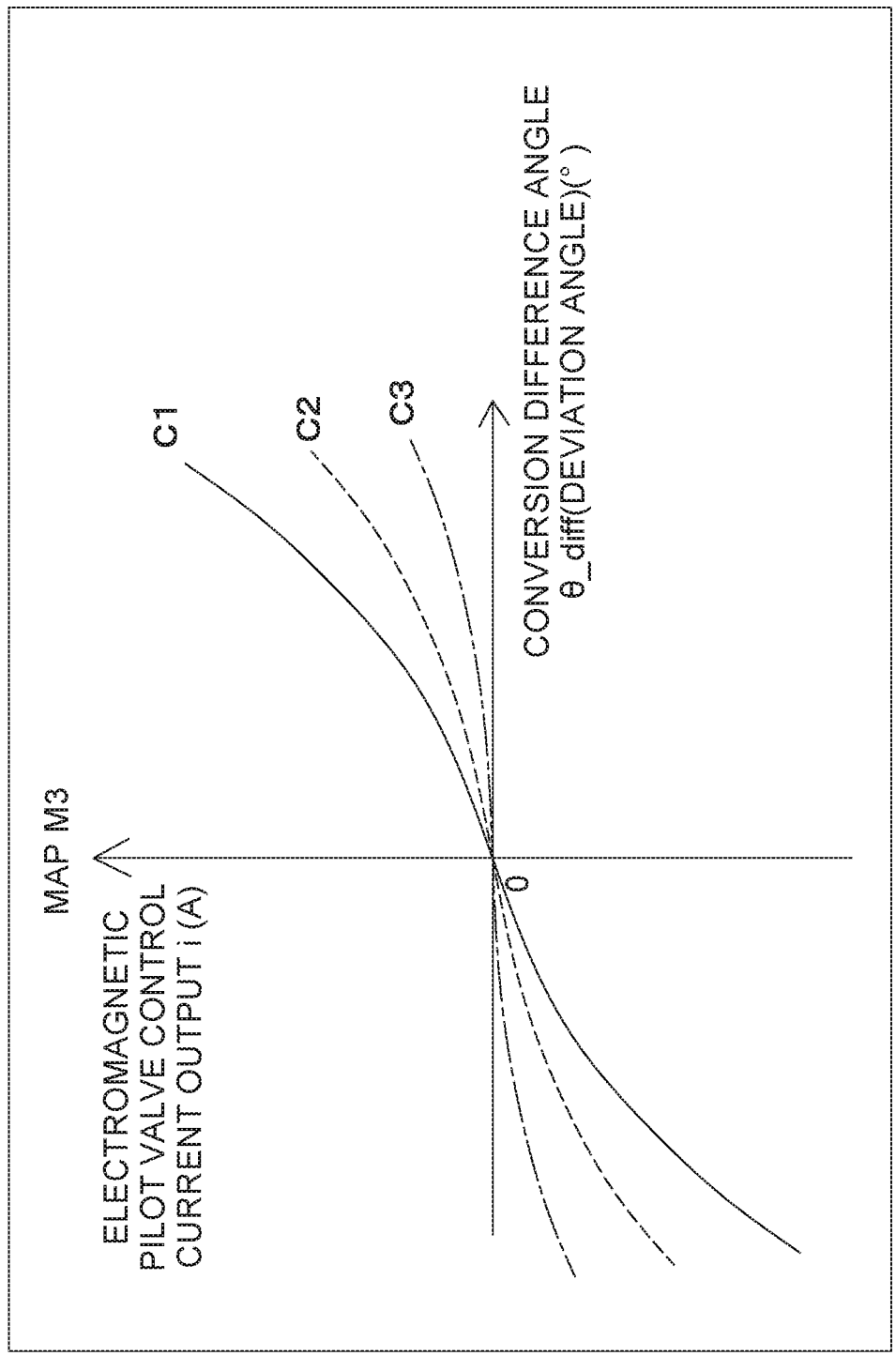
FIG. 8C is a view illustrating a map of FIG. 7.

FIG. 8A is a view illustrating an example of the map M1. FIG. 8B is a view illustrating an example of the map M2. FIG. 8C is a view illustrating an example of the map M3.

An example of the map M1 illustrated in FIG. 8A shows a graph of the relationship between the detection value θi_detect of the lever angle and the target angle θtarget. In this example, the detection value θi_detect of the lever angle and the target angle θtarget have a proportional relationship. By using this map M1, the controller 23 calculates the target angle θtarget from the detection value θi_detect of the lever angle. The target angle θtarget indicates a target angle of the vehicle body frame angle. Further, the map M1 of FIG. 8A shows θtarget=2×θi_detect, but the present invention is not limited to this.

An example of the map M2 illustrated in FIG. 8B shows a graph of the relationship between the detection value θs_detect of the steering angle and the actual steering angle θactual. In this example, the detection value θs_detect of the steering angle and the actual steering angle θactual have a proportional relationship. By using the map M2, the controller 23 calculates the actual steering angle θactual from the detection value θs_detect of the steering angle. The actual steering angle θactual indicates the actual angle of the vehicle body frame. Further, the map M2 of FIG. 8B shows θactual=1×θs_detect, and the value of θactual and the value of θs_detect are equal, but the present invention is not limited to this.

An example of the map M3 of FIG. 8C represents an example of a curve illustrating the value of the electromagnetic pilot valve control current output i with respect to the deviation angle θdiff.

The controller 23 stores curves about a plurality of vehicle speeds illustrating the value of the electromagnetic pilot valve control current output i with respect to the difference angle θdiff. In the example of the map M3 illustrated in FIG. 8C, for example, a curve C1 (solid line) when the vehicle speed is 10 km/h, a curve C2 (dotted line) when the vehicle speed is 20 km/h, and a curve C3 (dash-dotted line) when the vehicle speed is 30 km/h are set. The faster the vehicle speed, the smaller the value of the electromagnetic pilot valve control current output i. As a result, as the vehicle speed increases, the speed at which the actual vehicle body frame angle θs_real changes (also referred to as angular velocity) decreases, and it is possible to improve high-speed stability. Further, as the vehicle speed decreases, the speed at which the actual vehicle body frame angle θs_real changes (also referred to as angular velocity) increases, and it is possible to improve the operability at low speed. When the vehicle speed V is between C1, C2 and C3, the electromagnetic pilot valve control current output i is determined by interpolation calculation.

The controller 23 transmits an electric current to the electromagnetic pilot valve 33 based on FIG. 8C.

Although omitted in FIG. 3, the controller 23 may control the main pump 32, the pilot pump 34, and the like.

Further, the transmission and reception of signals between the controller 23 and the vehicle body frame angle sensor 47, the lever angle sensor 46, the vehicle speed sensor 24, and the electromagnetic pilot valve 33 may each be carried out wirelessly or by wire.

Further, the maps M1 to M3 may be linear or non-linear if the output is uniquely determined with respect to the input.

Transmission Mechanism 10

The transmission mechanism 10 transmits information on the actual vehicle body frame angle θs_real to the base member 43, and rotates the base member 43 to a position corresponding to the actual vehicle body frame angle θs_real.

Figure 9A:
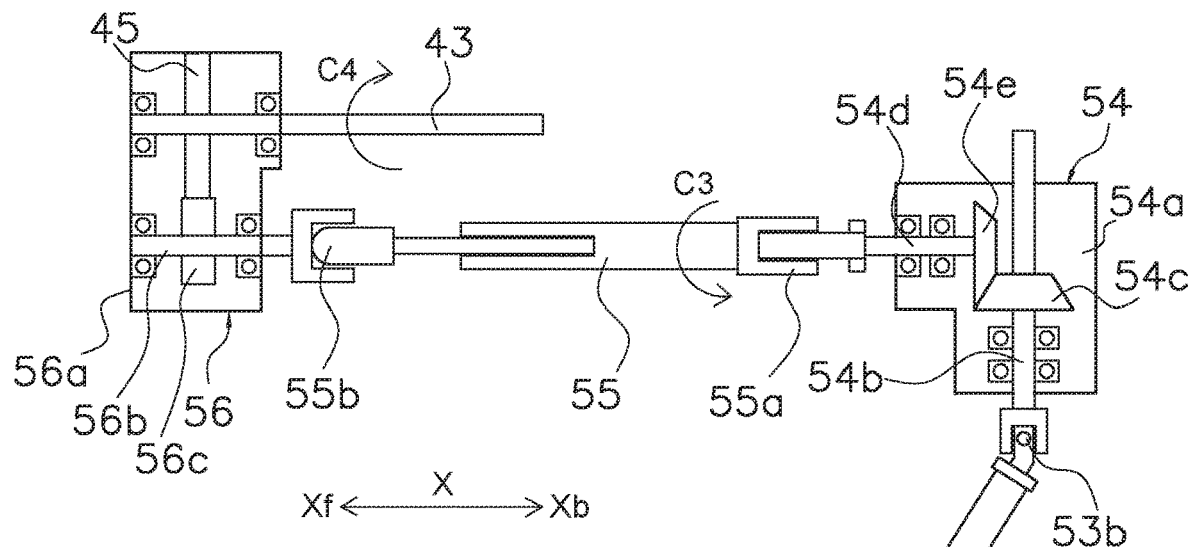
FIG. 9A is a configuration view illustrating a transmission mechanism in FIG. 3.

FIG. 9A is a schematic view illustrating the configuration of the transmission mechanism 10. As illustrated in the figure, the transmission mechanism 10 is a mechanism including links, and has a transmission member 51, a first conversion part 52, a universal joint 53, a bevel box 54, a universal joint 55, and a transmission part 56.

Figure 9B:
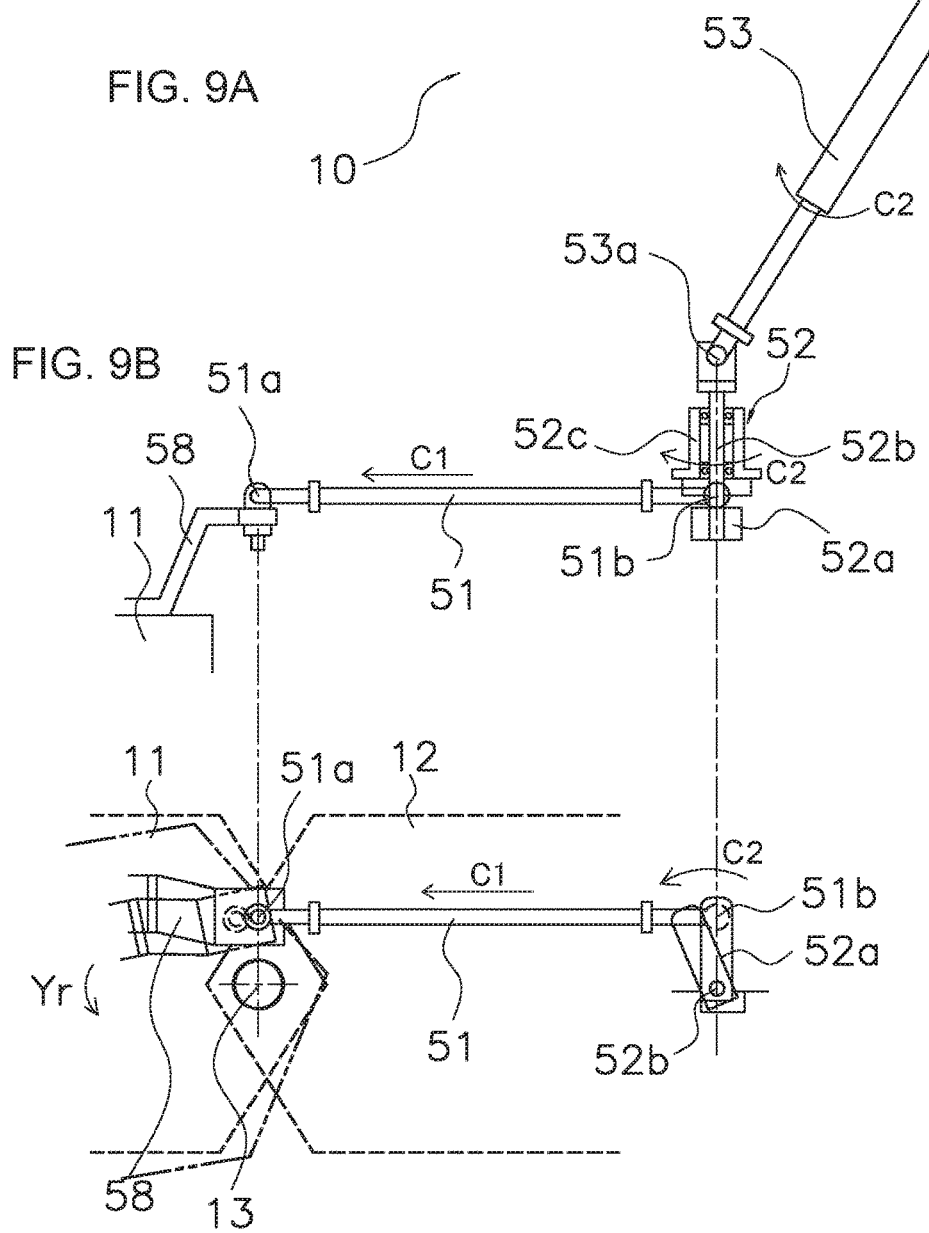
FIG. 9B is a rear view illustrating a configuration in the vicinity of the transmission mechanism of FIG. 9A.

FIG. 9B is a rear view illustrating the configuration in the vicinity of the transmission member 51.

The transmission member 51 is a rod-shaped member and is arranged substantially along the front-rear direction X. A front end 51a of the transmission member 51 is rotatably connected to a bracket 58 fixed to the front frame 11. The end 51a of the transmission member 51, which is a connection part with the bracket 58, is arranged near the coupling shaft part 13 in the vehicle width direction Y. A rear end 51b of the transmission member 51 extends to the rear frame 12 and is rotatably connected to a lever 52a of the first conversion part 52.

The first conversion part 52 converts the movement of the transmission member 51 in the front-rear direction X into movement in the rotation direction. The first conversion part 52 has the lever 52a, a rotation shaft 52b, and a shaft support part 52c. The rotation shaft 52b is arranged substantially along the vertical direction. The shaft support part 52c rotatably supports the rotation shaft 52b. The shaft support part 52c is fixed to the rear frame 12 and arranged on the floor of the cab 5. The lever 52a is fixed to the lower end of the rotation shaft 52b, and at least a part of the lever 52a is arranged under the floor of the cab 5. That is, the rotation shaft 52b penetrates the floor of the cab 5. Further, as illustrated in FIG. 9B, a quadrangle connecting the coupling shaft part 13, the end 51a, the end 51b and the rotation shaft 52b is a parallelogram, and a parallel link is formed.

The universal joint 53 is expandable and contractable, and is connected to the rotation shaft 52b. The lower end 53a of the universal joint 53 is connected to the upper end of the rotation shaft 52b. The upper end 53b of the universal joint 53 is connected to the bevel box 54.

The bevel box 54 is arranged inside the console box 20, for example. The bevel box 54 has a support case 54a, a first rotation shaft 54b, a first bevel gear 54c, a second rotation shaft 54d, and a second bevel gear 54e. The support case 54a is fixed to the console box 20. The first rotation shaft 54b is rotatably supported by the support case 54a. The first rotation shaft 54b is arranged substantially along the vertical direction, and the lower end of the first rotation shaft 54b is connected to the upper end 53b of the universal joint 53.

The first bevel gear 54c is arranged inside the support case 54a and is fixed to the first rotation shaft 54b.

The second rotation shaft 54d is rotatably supported by the support case 54a. The second rotation shaft 54d is arranged substantially along the horizontal direction. The universal joint 55 is connected to the front end of the second rotation shaft 54d.

The second bevel gear 54e is arranged inside the support case 54a and is fixed to the second rotation shaft 54d. The second bevel gear 54e meshes with the first bevel gear 54c. With such a bevel box 54, it is possible to convert the rotation about the vertical direction into the rotation about the horizontal direction.

The universal joint 55 is expandable and contractable, and is arranged inside the console box 20. The rear end 55a of the universal joint 55 is connected to the second rotation shaft 54d. The front end 55b of the universal joint 55 is connected to the transmission shaft 56b of the transmission part 56.

The transmission part 56 transmits the rotation of the universal joint 55 to the base member 43. The transmission part 56 has a shaft support part 56a, a transmission shaft 56b, and a transmission gear 56c. The shaft support part 56a is fixed inside the console box 20. The transmission shaft 56b is arranged substantially along the horizontal direction. The rear end of the transmission shaft 56b is connected to the front end 55b of the universal joint 55. The transmission gear 56c is fixed to the transmission shaft 56b inside the shaft support part 56a.

The transmission gear 56c meshes with a gear that is the transmission mechanism connecting part 45 fixed to the shaft 43a of the base member 43.

When the front frame 11 is rotated in the right direction (arrow Yr in the rear view of FIG. 8(b)) as illustrated by the two-dot chain line, the bracket 58 is also rotated, and the transmission member 51 is also moved forward (arrow C1). Then, the lever 52a also rotates in the right direction (arrow C2) when viewed from above, and the universal joint 53 also rotates in the right direction. The rotation of the universal joint 53 is converted by the bevel box 54 into the rotation of the left direction (arrow C3) when viewed from the rear, and the transmission shaft 56b and the transmission gear 56c also rotate in the left direction through the universal joint 55 when viewed from the rear. As a result, the transmission mechanism connecting part 45 and the shaft 43a rotate in the right direction (arrow C4) when viewed from the rear, so that the base member 43 also rotates in the right direction.

When the front frame 11 rotates in the left direction, the bracket 58 moves rearward, and the lever 52a and the universal joint 53 rotate in the left direction when viewed from above. Due to the rotation of the universal joint 53, the universal joint 55, the transmission shaft 56b, and the transmission gear 56c are also rotated in the right direction through the bevel box 54 when viewed from the rear. As a result, the transmission mechanism connecting part 45 and the shaft 43a rotate in the left direction when viewed from the rear, and the base member 43 also rotates in the left direction.

Here, the reduction ratio from the transmission gear 56c to the transmission mechanism connecting part 45, which is a gear, is set so as to have the relationship illustrated in FIG. 5A or FIG. 5B. For example, in the case of FIG. 5A, $\theta b\_real = 0.5 \times \theta s\_real$ is set, and when the vehicle body frame angle $\theta s\_real$ of the front frame 11 with respect to the rear frame 12 is 40 degrees, the rotation angle of the base member 43 with respect to the support part 42 is set to 20 degrees.

Operation

The control operation of the wheel loader 1 according to the present embodiment will be described below. FIG. 10A to FIG. 10E are views illustrating the operation of the steering device 22 and the state of the vehicle body frame 2. FIG. 11 is a flowchart illustrating the operation of the wheel loader 1 of this embodiment.

Figure 10A:
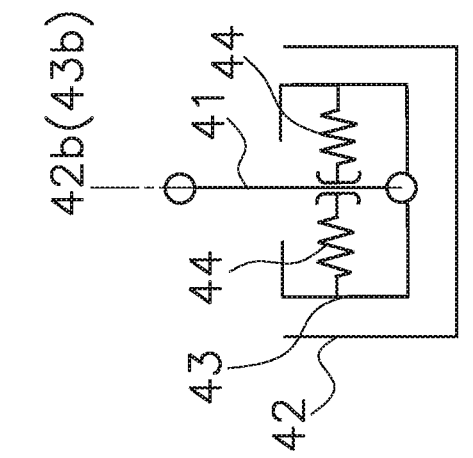
FIG. 10A is a view for explaining a control operation of the wheel loader in FIG. 1.
Figure 10A:
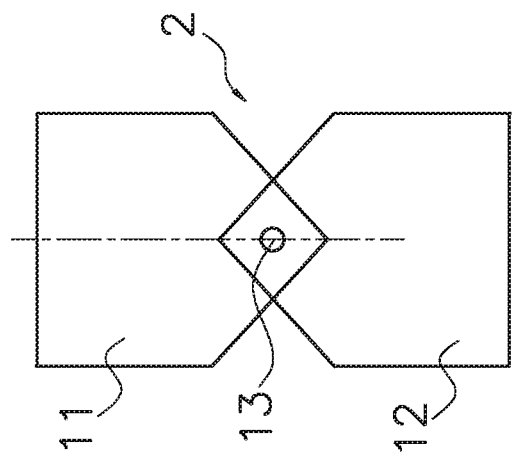
Figure 11:
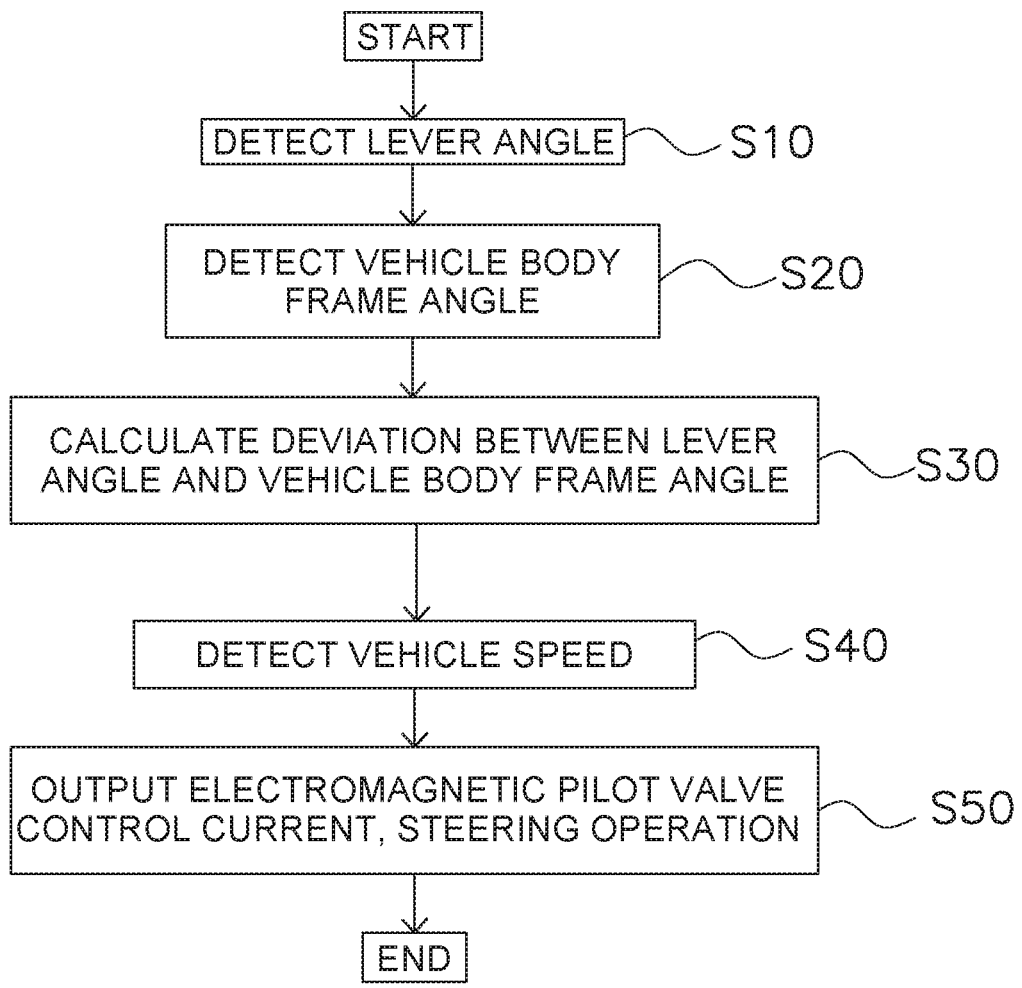
FIG. 11 is a flowchart illustrating a control operation of the wheel loader illustrated in FIG. 1.

As illustrated in FIG. 10A, in the case where the base reference position 43b of the base member 43 matches the support reference position 42b of the support part 42, and the longitudinal direction of the joystick lever 41 also matches the support reference position 42b (also referred to as an initial position.), the actual lever angle $\theta i\_real$ of the joystick lever 41 is zero.

At this time, the electromagnetic pilot valve 33 is in the neutral position. In this case, the hydraulic valve 31 is also in the neutral position. Therefore, the oil is not supplied to or discharged from the left and right steering cylinders 9a and 9b, and the actual vehicle body frame angle $\theta s\_real$ is maintained at zero. In this way, since the actual vehicle body frame angle θs_real is also zero, the base member 43 is also located at the initial position.

Figure 10B:
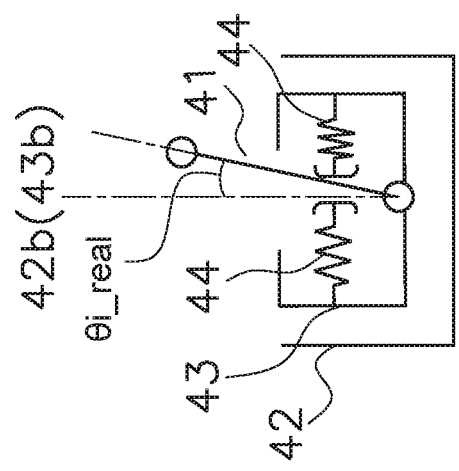
FIG. 10B is a view for explaining a control operation of the wheel loader in FIG. 1.
Figure 10B:
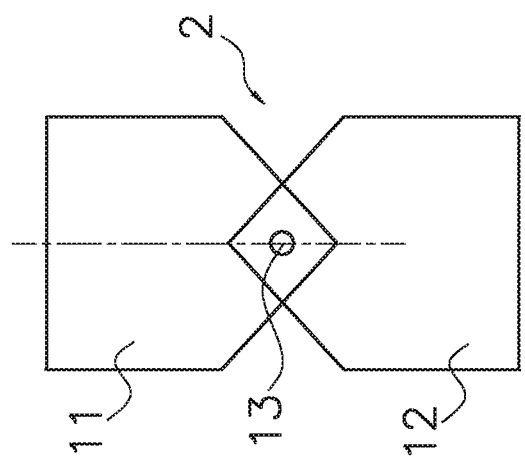

Then, the operator applies an operating force Fin to rotate the joystick lever 41 from the support reference position 42b to the right side. When the operating force Fin exceeds the initial biasing force F1 of the biasing member 44, the joystick lever 41 rotates in the right direction and the actual lever angle θi_real increases, as illustrated in FIG. 10B. Further, the relative angle θr_real with the base member 43 increases with the movement in the right direction, so that the counterforce applied by the biasing member 44 increases as illustrated in FIG. 4.

In step S10, the lever angle sensor 46 detects the actual lever angle θi_real of the joystick lever 41 operated by the operator as the detection value θi_detect of the lever angle.

Next, in step S20, the vehicle body frame angle sensor 47 detects the actual vehicle body frame angle θs_real as a detection value θs_detect of the vehicle body frame angle.

At this time, the actual body frame angle θs_real is zero due to the delay in the reaction of the left and right steering cylinders 9a and 9b. Therefore, the detection value θs_detect of the vehicle body frame angle, which is the value detected by the vehicle body frame angle sensor 47, is zero. Since the actual vehicle body frame angle θs_real is almost zero, the base member 43 also does not rotate. Therefore, as illustrated in FIG. 10B, when the joystick lever 41 is rotated in the right direction, the joystick lever 41 is rotated in the right direction with respect to the base reference position 43b of the base member 43. Further, the joystick lever 41 is biased by the biasing member 44 so as to return to the base reference position 43b (also referred to as the support reference position 42b in the state of FIG. 10B).

Next, in step S30, the controller 23 converts the detection value θi_detect of the detected lever angle into the target angle θtarget by using the map M1 illustrated in FIG. 8A. Further, the controller 23 converts the detection value θs_detect of the vehicle body frame angle into the actual steering angle θactual by using the map M2 illustrated in FIG. 8B. Further, the controller 23 calculates the difference between the target angle θtarget and the actual steering angle θactual to obtain the difference angle θdiff.

Next, in step S40, the controller 23 converts the detection signal V_detect from the vehicle speed sensor 24 to obtain the vehicle speed V.

Next, in step S50, the controller 23 uses the difference angle θdiff and the vehicle speed V to determine the electromagnetic pilot valve control current output i from the stored map M3 illustrated in FIG. 8C, and the controller 23 gives a command.

Since the joystick lever 41 is rotated in the right direction, the electromagnetic pilot valve 33 is in the right pilot position, and the pilot pressure controlled by the electromagnetic pilot valve 33 is supplied to the hydraulic valve 31. By supplying the pilot pressure, the hydraulic valve 31 is in the right steering position, and the main hydraulic pressure is supplied to the steering cylinders 9a and 9b so as to extend the steering cylinder 9a and contract the steering cylinder 9b.

As a result, the actual vehicle body frame angle θs_real gradually increases, and the front frame 11 is oriented in the right direction with respect to the rear frame 12.

This change in the actual vehicle body frame angle θs_real is reflected on the angle of the base member 43 via the transmission mechanism 10.

Figure 10C:
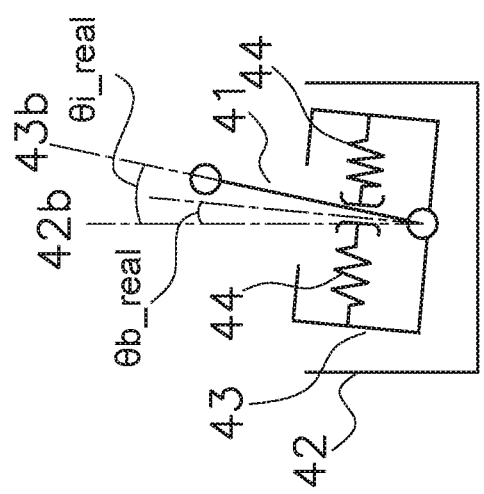
FIG. 10C is a view for explaining a control operation of the wheel loader in FIG. 1.
Figure 10C:
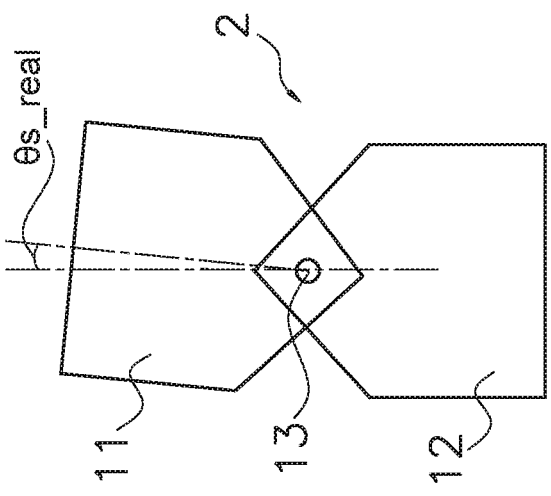

That is, as illustrated in FIG. 10C, the angle of the base member 43 also rotates to a position corresponding to the vehicle body frame angle θs_real. Thus, when the base member 43 rotates toward the rotation position of the joystick lever 41, as illustrated in FIG. 10C, the deviation angle θr_real between the actual lever angle θi_real and the actual base angle θb_real decreases, so, the biasing force of the biasing member 44 decreases.

Figure 10D:
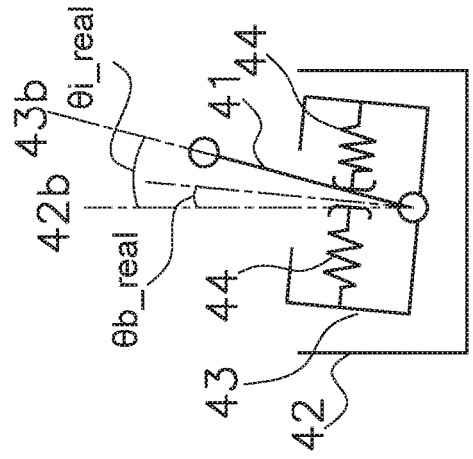
FIG. 10D is a view for explaining a control operation of the wheel loader in FIG. 1.
Figure 10D:
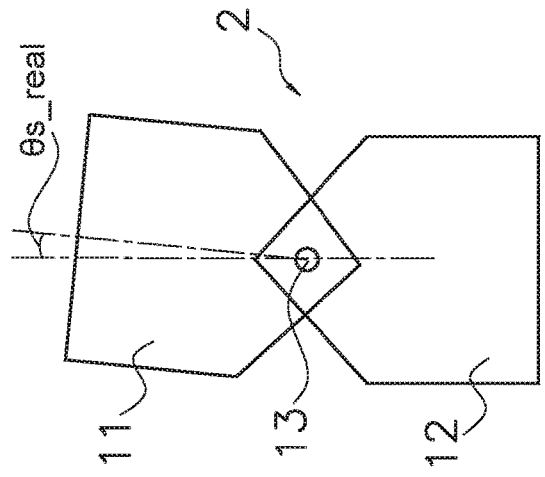

As illustrated in FIG. 10D, when the operator stops the joystick lever 41 at a predetermined actual lever angle θi_real=θa, the actual vehicle body frame angle θs_real gradually increases, so the difference angle θdiff decreases.

Figure 10E:
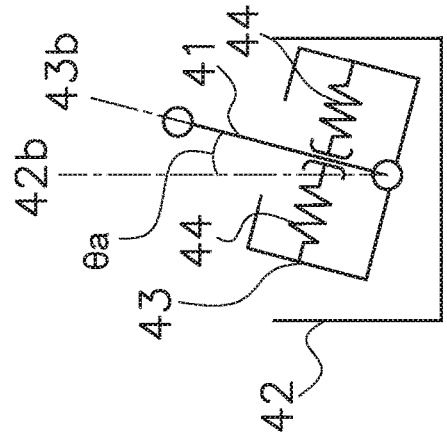
FIG. 10E is a view for explaining a control operation of the wheel loader in FIG. 1.
Figure 10E:
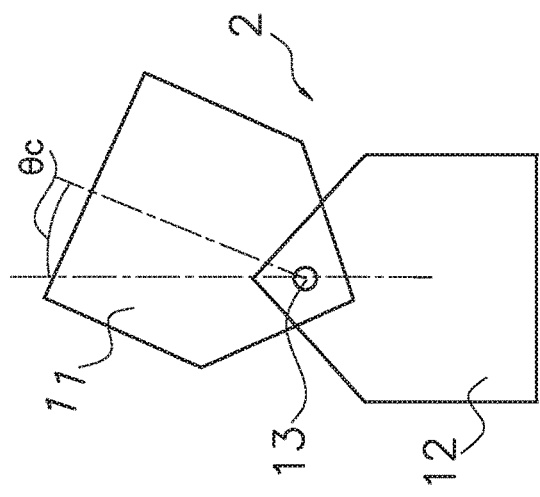

Then, as illustrated in FIG. 10E, when the actual body frame angle θs_real moves and the base angle θb_real becomes θa, the difference angle θdiff becomes zero. At this time, the electromagnetic pilot valve 33 is in the neutral position, and the hydraulic valve 31 is also in the neutral position. Therefore, the oil is not supplied to or discharged from the left and right steering cylinders 9a and 9b, and the actual vehicle body frame angle θs_real is maintained at θc obtained by converting the rotation angle θa according to FIG. 5A. Further, as illustrated in FIG. 10E, the base member 43 also rotates in the right direction by θa, and the joystick lever 41 is positioned at the base reference position 43b of the base member 43.

Figure 10F:
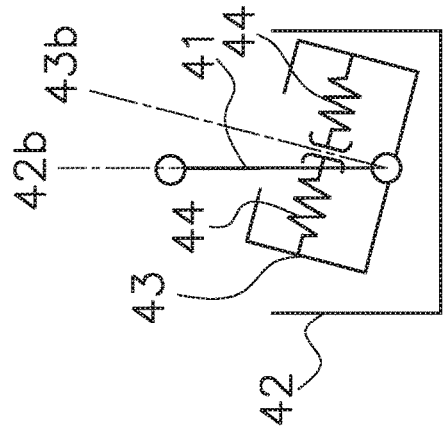
FIG. 10F is a view for explaining a control operation of the wheel loader in FIG. 1.
Figure 10F:
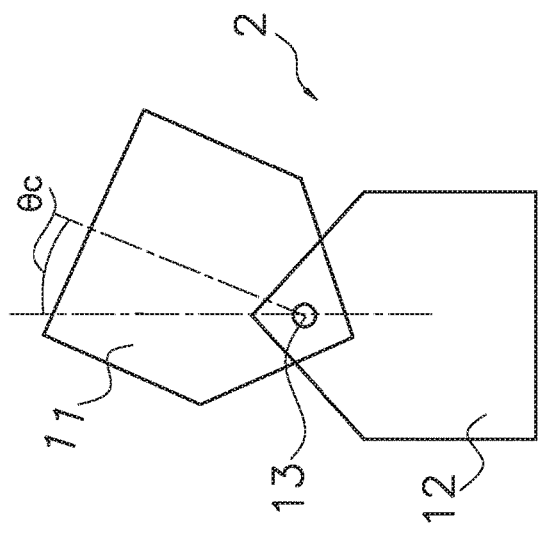

Next, the operator returns the joystick lever 41 from the right side position (θi_real=θa) toward the support reference position 42b(θi_real=zero). As illustrated in FIG. 10F, the joystick lever 41 is rotated in the left direction so that the joystick lever 41 is arranged at the support reference position 42b.

Before returning the joystick lever 41 to the support reference position 42b with respect to the support part 42 (state illustrated in FIG. 10E), the positional relationship between the joystick lever 41 and the base member 43 is similar to that in FIG. 10A. Therefore, the counterforce at the start of movement when the joystick lever 41 is operated is the same as the counterforce at the start of movement from the initial position. That is, in the present embodiment, since the base member 43 rotates to the position corresponding to the actual vehicle body frame angle θs_real, regardless of the position of the joystick lever 41, the counterforce applied to the operation is determined according to the state of the electromagnetic pilot valve 33 (intermediate position, right pilot position, the left pilot position).

At this time, the actual body frame angle θs_real is in the state of θc due to the delay in the reaction of the left and right steering cylinders 9a and 9b. Further, since the actual base angle θb_real of the base member 43 is θa similarly to the actual vehicle body frame angle θs_real, the biasing member 44 biases the joystick lever 41 relative to the base member 43 so as to be in the state of FIG. 10E.

Since the actual vehicle body frame angle θs_real is in the state of θc as described above, the difference angle θdiff decreases from zero and becomes minus. Then, the electromagnetic pilot valve 33 is in the left pilot position, the pilot pressure is supplied to the hydraulic valve 31, and the hydraulic valve 31 is in the left steering position. As a result, the hydraulic pressure is supplied so that the steering cylinder 9b extends and the steering cylinder 9a contracts.

Due to the supply of this hydraulic pressure, the actual vehicle body frame angle θs_real gradually decreases from the rotation angle θc. This actual change in the vehicle body frame angle θs_real is reflected on the base member 43 via the transmission mechanism 10, and the base member 43 also rotates in the same manner as the actual change in the vehicle body frame angle θs_real.

Then, when the actual vehicle body frame angle θs_real becomes zero, the difference from the actual lever angle θi_real (=0) becomes zero. At this time, the electromagnetic pilot valve 33 is in the neutral position, and the hydraulic valve 31 is also in the neutral position. Therefore, the oil is not supplied to or discharged from the left and right steering cylinders 9a and 9b, and the actual vehicle body frame angle θs_real is returned to zero and maintained. As a result, the front frame 11 is returned to the rear frame 12 in the direction along the front-rear direction.

Further, as the actual vehicle body frame angle θs_real decreases, the base member 43 rotates so that the actual base angle θb_real also becomes zero, and returns to the initial position (θb_real=0) as illustrated in FIG. 10A.

Further, the control operation when the joystick lever 41 is rotated to the left is the same as the above, and therefore is omitted.

Embodiment 2

Next, a wheel loader 101 of the second embodiment according to the present invention will be described. The wheel loader of the second embodiment differs from the wheel loader 1 of the first embodiment in the configuration of the steering system. Therefore, this difference will be mainly described, and description of other similar configurations will be omitted.

Figure 12:
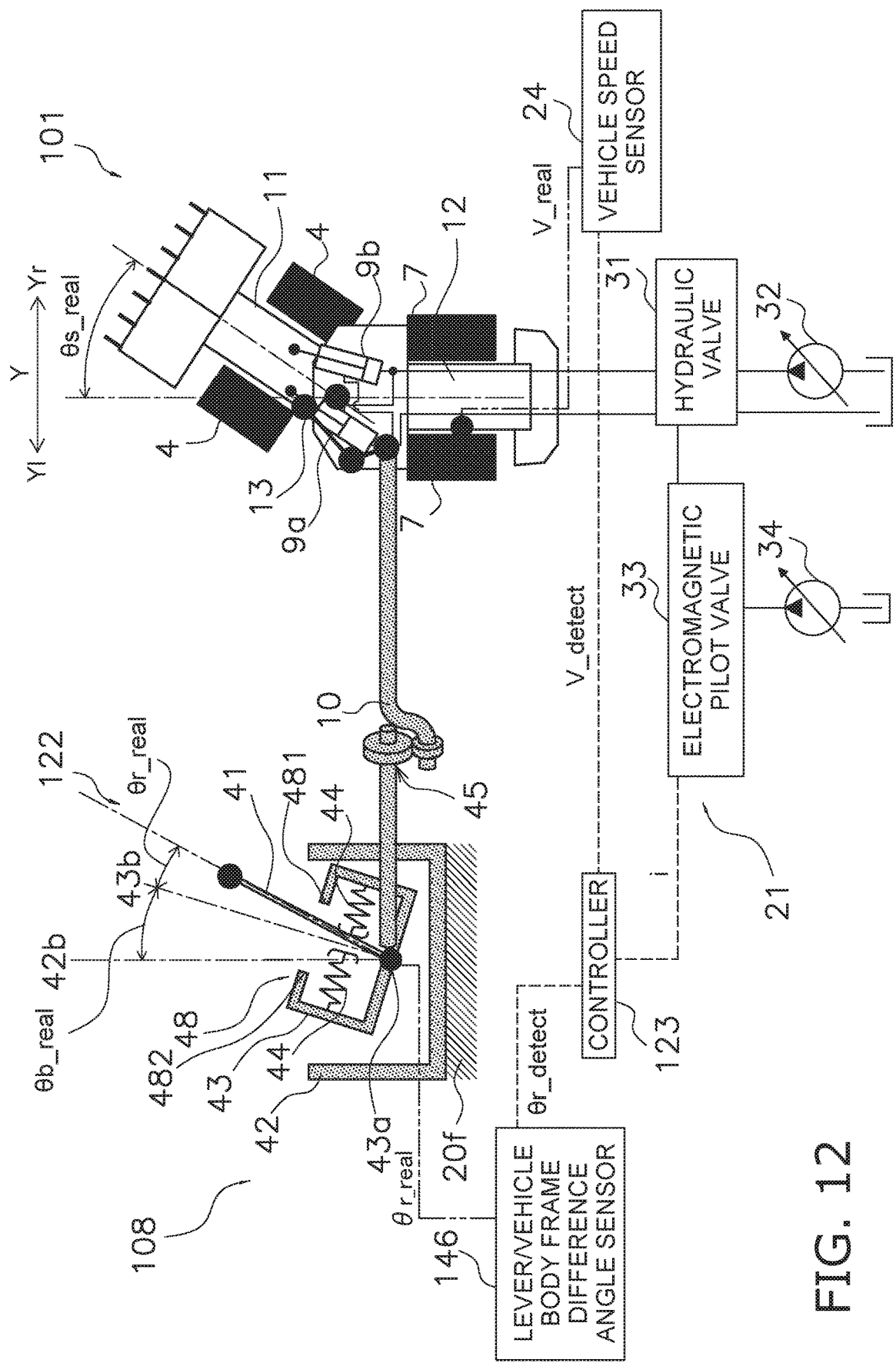
FIG. 12 is a configuration view illustrating a steering system of a second embodiment according to the present invention.

FIG. 12 is a view illustrating the configuration of a steering system 108 according to the second embodiment.

Although the steering device 22 of the steering system 8 of the first embodiment is provided with the lever angle sensor 46 that detects the rotation angle of the joystick lever 41 with respect to the support part 42, the steering system 108 of the second embodiment is provided with a lever/vehicle body frame difference angle sensor 146 for calculating the angle of the joystick lever 41 with respect to the base member 43. The lever/vehicle body frame difference angle sensor 146 corresponds to an example of a second lever angle sensor.

When the shaft 43a of the base member 43 is inserted into the through hole formed in the proximal end part of the joystick lever 41 and the joystick lever 41 is configured to be rotatable with respect to the base member 43, the lever/vehicle body frame difference angle sensor 146 may the rotation angle of the joystick lever 41 via a gear or the like. For example, the lever/vehicle body frame difference angle sensor 146 is a potentiometer or the like and is fixed to the base member 43. A shaft connected to the lever/vehicle body frame difference angle sensor 146 and a gear fixed to the shaft mesh with a gear formed on the outer periphery of the proximal end part of the joystick lever 41. With such a configuration, the lever/vehicle body frame difference angle sensor 146 fixed to the base member 43 can detect the actual relative angle θr_real of the joystick lever 41 with respect to the base member 43 as the detection value θr_detect of the relative angle. The detection value θr_detect of the relative angle corresponds to an example of the third detection value.

The actual relative angle θr_real of the joystick lever 41 with respect to the base member 43 corresponds to the difference between the actual lever angle θi_real of the joystick lever 41 with respect to the support part 42 and the actual base angle θb_real of the base member 43 with respect to the support part 42. The actual base angle θb_real of the base member 43 corresponds to the vehicle body frame angle θs_real by the transmission mechanism 10.

Figure 13:
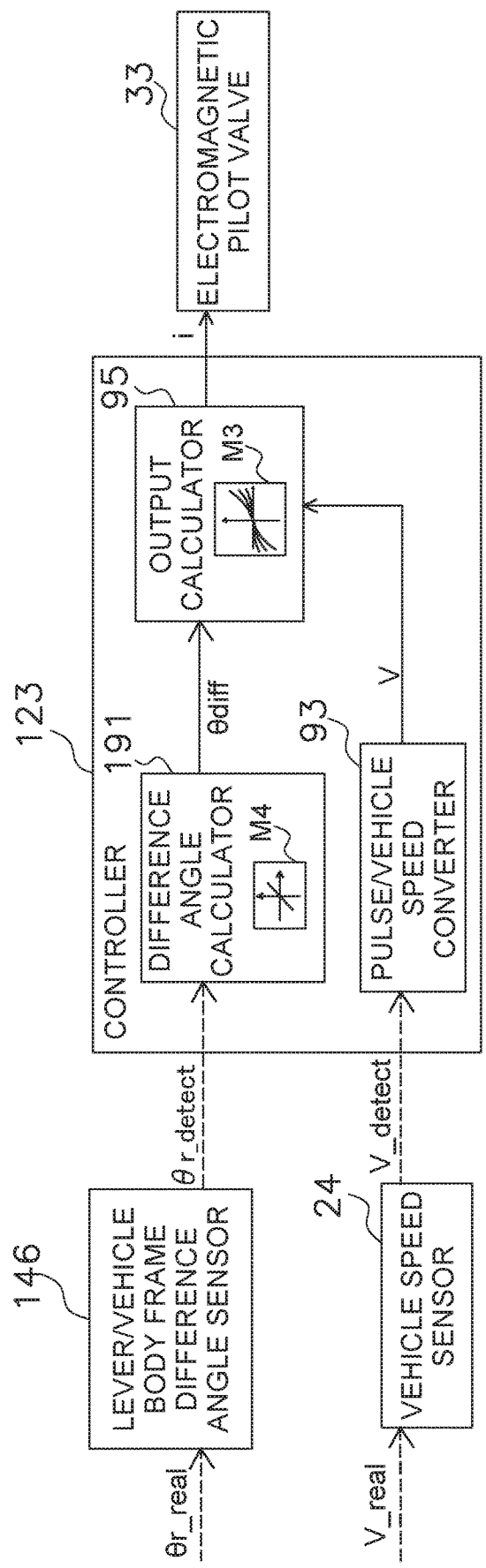
FIG. 13 is a block diagram illustrating input/output and calculation of the controller of FIG. 12.

FIG. 13 shows a block diagram of input/output and calculation of a controller 123. Compared to the controller 23 of the first embodiment, the controller 123 of the second embodiment does not have the target angle calculator 91, the actual steering angle calculator 92 and the difference calculator 94, and has a difference angle calculator 191.

The detection value θr_detect is input to the controller 123 from the lever/vehicle body frame difference angle sensor 146, and the difference angle calculator 191 calculates the difference angle θdiff by using the map M4. The detection value V_detect of the vehicle speed is input to the controller 123 from the vehicle speed sensor 24. The pulse/vehicle speed converter 93 converts the input pulse into a vehicle speed and calculates a vehicle speed signal V.

Then, the output calculator 95 calculates the electromagnetic pilot valve control current output i from the difference diff and the vehicle speed signal V by using the map M3, and outputs the electromagnetic pilot valve control current output i to the electromagnetic pilot valve 33. The maps M3 and M4 are stored in the controller 123.

Figure 14:
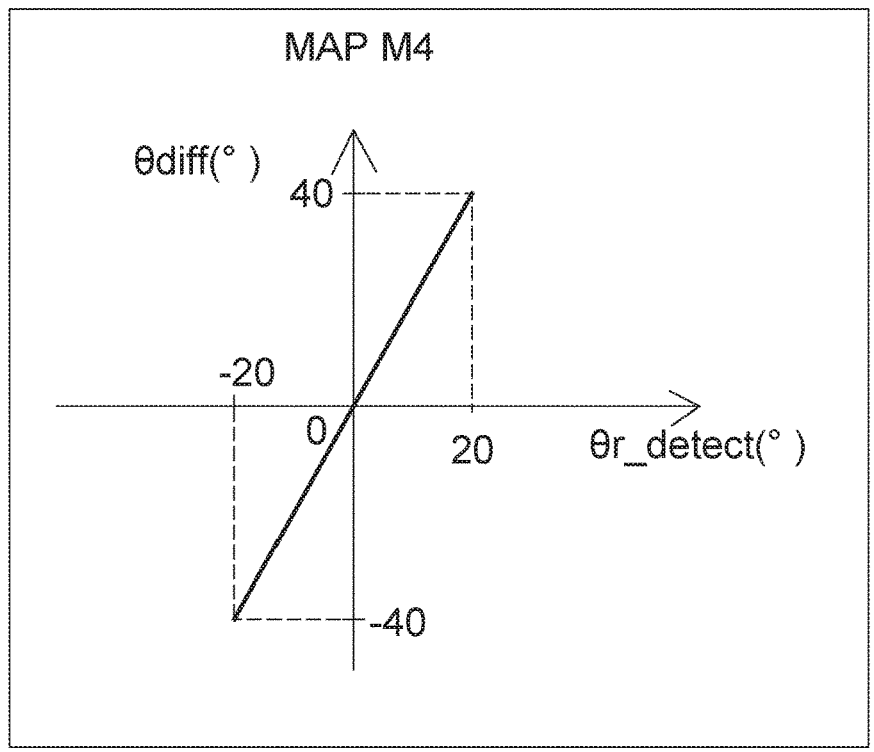
FIG. 14 is a view illustrating a map of FIG. 13.

FIG. 14 is a view illustrating an example of the map M4.

An example of the map M4 illustrated in FIG. 14 shows a graph of the relationship between the detection value θr_detect of the relative angle and the difference angle θdiff. In this example, the relative angle detection value θr_detect and the difference angle θdiff have a proportional relationship. By using this map M4, the controller 123 calculates the difference angle θdiff from the detection value θr_detect of the relative angle. In the map M4 of FIG. 14, θdiff=2× θr_detect is set, but the present invention is not limited to this.

Figure 15:
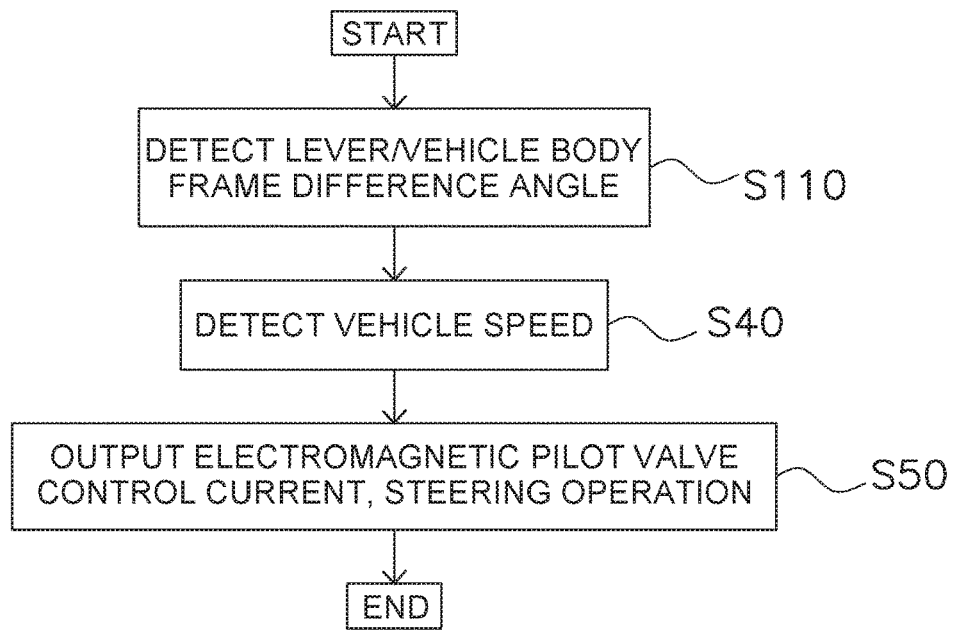
FIG. 15 is a flowchart illustrating the control operation of the wheel loader illustrated in FIG. 12.

FIG. 15 is a flowchart illustrating the operation of the wheel loader 101 according to the second embodiment. In step S110, the controller 123 converts the relative angle detection value θr_detect input from the lever/vehicle body frame difference angle sensor 146 into a difference angle θdiff by using the map M4 illustrated in FIG. 14.

Next, in step S40, the controller 23 converts the detection signal V_detect from the vehicle speed sensor 24 to obtain the vehicle speed V.

Next, in step S50, the controller 23 uses the difference angle θdiff and the vehicle speed V to determine the electromagnetic pilot valve control current output i from the stored map M3 illustrated in FIG. 8C and gives a command to the electromagnetic pilot valve 33.

The map M4 may be linear or non-linear if the output is uniquely determined with respect to the input.

Third Embodiment

Next, a wheel loader 201 of the third embodiment according to the present invention will be described. The wheel loader of the third embodiment differs from the wheel loader 1 of the first embodiment in the configuration of the steering system. Therefore, this difference will be mainly described, and description of other similar configurations will be omitted.

Figure 16:
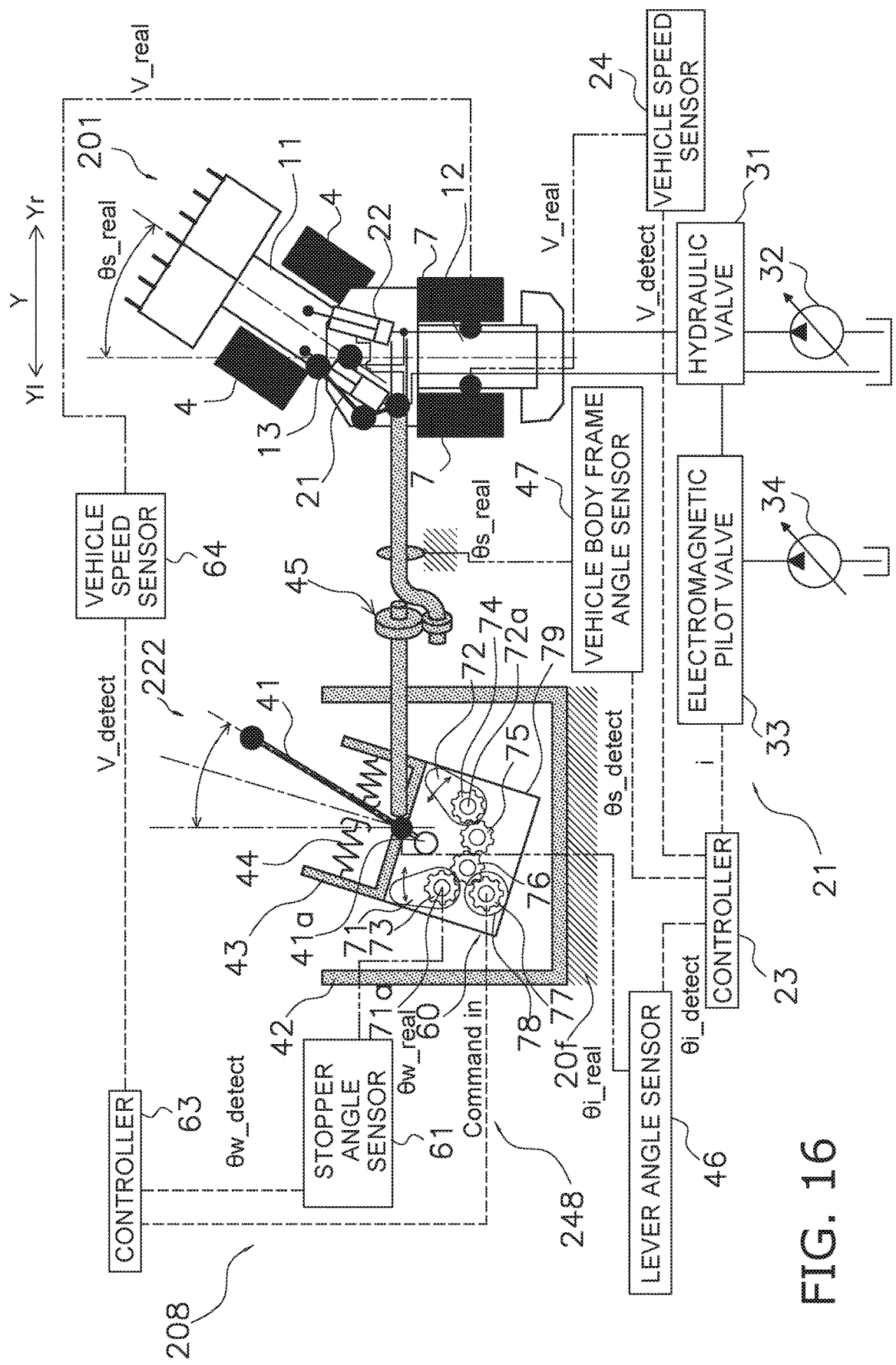
FIG. 16 is a configuration view illustrating a steering system of a third embodiment according to the invention.

FIG. 16 is a view illustrating the configuration of a steering system 208 of the third embodiment.

In the steering device 22 of the above-described first embodiment, the rotation range of the joystick lever 41 is restricted by the contact parts 481 and 482 of the restriction part 48, but in a steering device 222 of the third embodiment, the restriction part 48 is not provided, and the rotation range is restricted by the restriction part 248.

The steering device 222 of the third embodiment has a restriction part 248 instead of the restriction part 48 of the steering device 22 of the first embodiment, a controller 63, and a vehicle speed sensor 64. The restriction part 248 is capable of restricting the rotation angle of the joystick lever 41 with respect to the base member 43 within a predetermined range and changing the predetermined range.

The restriction part 248 has a stopper part 60 and a stopper angle sensor 61. The stopper angle sensor 61 corresponds to an example of a position detection part.

The stopper part 60 increases the counterforce applied to the joystick lever 41 when the relative angle θr_real of the joystick lever 41 to the base member 43 reaches a predetermined angle θ3 (positive value) or θ5 (negative value). The stopper part 60 has a first stopper 71, a second stopper 72, a first gear 73, a second gear 74, a third gear 75, a fourth gear 76, a fifth gear 77, and an electric motor 78. The first stopper 71 and the second stopper 72 correspond to an example of a contact part. The electric motor 78 corresponds to an example of a drive part.

The stopper part 60 is arranged in a housing 79 that rotates together with the base member 43. In addition, the joystick lever 41 extends beyond the rotation fulcrum into the housing 79, and a cam 41a is arranged at the end inside the housing 79.

The first stopper 71 and the second stopper 72 are arranged so that the cam 41a is arranged between them. The first stopper 71 and the second stopper 72 are rotatably supported by the housing 79. In FIG. 16, the upper end of the first stopper 71 rotates about a shaft 71a. In FIG. 16 the upper end of the second stopper 72 rotates about a shaft 72a. Since the cam 41a can freely move between the first stopper 71 and the second stopper 72, when the cam 41a abuts the first stopper 71 or the second stopper 72, further rotation of the joystick lever 41 is restricted.

The first gear 73 is fixed to the shaft 71a of the first stopper 71, and the second gear 74 is fixed to the shaft 72a of the second stopper 72. The third gear 75 meshes with the second gear 74 and is rotatably supported by the housing 79. The fourth gear 76 meshes with the third gear 75 and the first gear 73, and is rotatably supported by the housing 79. The fifth gear 77 is fixed to the output shaft of the electric motor 78 and meshes with the fourth gear 76. The electric motor 78 is supported by the housing 79 and is driven by a command from the controller 63.

Figure 17:
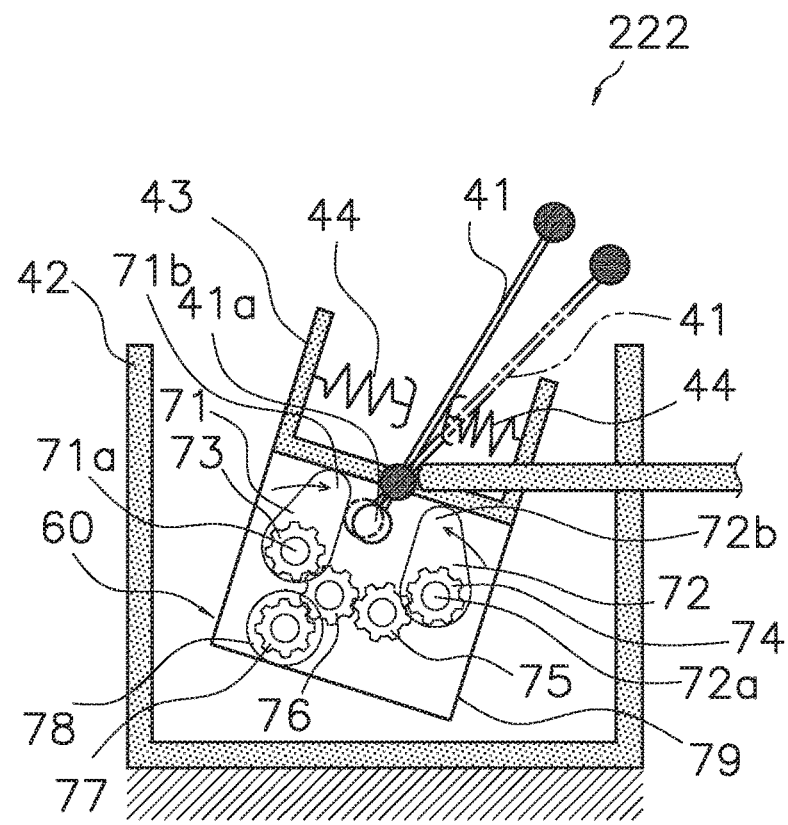
FIG. 17 is a view for explaining the contact of the cam with the first stopper in the steering device in FIG. 16.

With this configuration, for example, in FIG. 16, when the electric motor 78 is driven to rotate the fifth gear 77 to the right, the fourth gear 76 rotates to the left and the first gear 73 rotates to the right, the tip 71b of the first stopper 71 moves in a direction approaching the cam 41a, as illustrated in the enlarged FIG. 17. Further, the third gear 75 rotates to the right, the second gear 74 rotates to the left, and the tip 72b of the second stopper 72 moves in a direction approaching the cam 41a. As a result, the width of the tip 71b of the first stopper 71 and the tip 72b of the second stopper 72 is narrowed, and the rotation range of the joystick lever 41 is narrowed. The joystick lever 41 in a state where the cam 41a is in contact with the first stopper 71 is illustrated by a two-dot chain line.

Conversely, when the electric motor 78 is driven to rotate the fifth gear 77 in the left direction, the fourth gear 76 rotates in the right direction, the first gear 73 rotates in the left direction and the tip of the first stopper 71 moves in a direction away from the cam 41a. Further, the third gear 75 rotates in the left direction, the second gear 74 rotates in the right direction, and the tip of the second stopper 72 moves away from the cam 41a. As a result, the widths of the tip of the first stopper 71 and the tip of the second stopper 72 become wider, and the range of rotation of the joystick lever 41 becomes wider.

Figure 18:
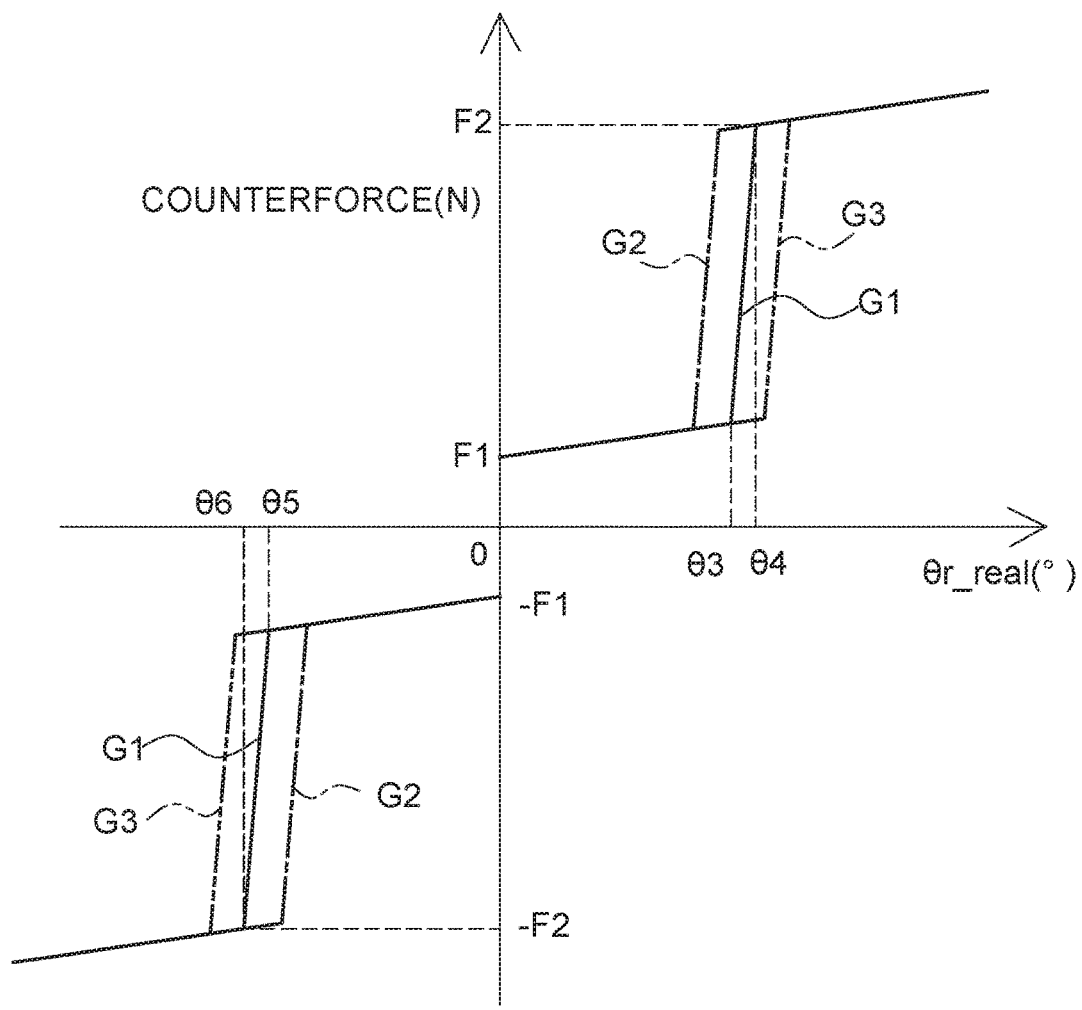
FIG. 18 is a view illustrating a counterforce with respect to a difference between a lever angle and a base plate angle in the third embodiment according to the present invention.

FIG. 18 is a view illustrating a graph G1 of the counterforce applied to the joystick lever 41 with respect to the actual relative angle θr_real of the joystick lever 41 with respect to the base member 43. The relative angle θ3 indicates the position of the first stopper 71, and the relative angle θ5 indicates the position of the second stopper 72. As illustrated in FIG. 13, when the value of θr_real is 0 to θ3 or 0 to θ5, only the counterforce by the biasing member 44 is applied. When the value of θr_real reaches θ3 or θ5, the cam 41a of the joystick lever 41 comes into contact with the first stopper 71 or the second stopper 72, so that the rate of increase in the counterforce increases rapidly. Further even after the value of θr_real reaches θ3 or θ5, the operator resists the counterforce and continues to apply the force, whereby the first stopper 71 or the second stopper 72 is continuously pushed, and when the value of θr_real reaches θ4 or θ6, the increasing rate of the counterforce decreases. The counterforce when the value of θr_real is θ4 is illustrated as F2, and the counterforce when the value of θr_real is θ6 is illustrated as −F2. A counterforce with a value of θr_real equal to or greater than θ4 or equal to or less than θ6 is applied by the position feedback of the electric motor 78.

The stopper angle sensor 61 is composed of, for example, a potentiometer, and is provided on the shaft 71a of the first stopper 71. The stopper angle sensor 61 detects the actual stopper angle θw_real as a detection value θw_detect of the stopper angle.

The vehicle speed sensor 64 corresponds to an example of a vehicle speed detection part, detects the vehicle speed V_real of the wheel loader 1, and transmits it as a detection signal V_detect to the controller 63.

The controller 63 gives a command to the electric motor 78 while feeding back the detection value of the stopper angle sensor 61 so as to change the stopper angle θw_real based on the vehicle speed V from the vehicle speed sensor 24. For example, when the vehicle speed V_real is high, the controller 63 gives a command to the electric motor 78 so that the tip 71b of the first stopper 71 and the tip 72b of the second stopper 72 approach the cam 41a. As a result, the rotation range of the joystick lever 41 is narrowed, and it is possible to improve the operation stability at high speed.

Further, for example, when the vehicle speed V_detect is slow, the controller 63 gives a command to the electric motor 78 so that the tip of the first stopper 71 and the tip of the second stopper 72 are separated from the cam 41a. As a result, the rotation range of the joystick lever 41 is widened, and it is possible to improve the operability at low speed.

In addition, in FIG. 13, for example, a counterforce graph when the rotation range is narrowed is illustrated by a one-dot chain line G2, and a counterforce graph when the rotation range is widened is illustrated by a two-dot chain line G3.

Further, θ3 and θ5 may be the same values or different values, and θ4 and θ6 may be the same values or different values. In addition, in FIG. 18, the counterforce at θ4 and θ6 is F2, but the counterforce at θ4 and θ6 may be different.

Characteristics (1)

The steering device 22, 122, or 222 of the first, the second, or the third embodiment is provided with the support part 42, the base member 43, the joystick lever 41, the biasing member 44, and the transmission mechanism connecting part 45 including a link. The base member 43 is rotatably supported by the support part 42. The joystick lever 41 is rotatably supported by the support part 42 or the base member 43. The biasing member 44 is interposed between the joystick lever 41 and the base member 43, and biases the joystick lever 41 to the base reference position 43b with respect to the base member 43. The transmission mechanism connecting part 45 is connected to the transmission mechanism 10 that transmits the rotation based on the rotation angle of the coupling shaft part 13 of the wheel loader 1, 101, or 201 to the base member 43.

Here, the biasing member 44 interposed between the base member 43 and the joystick lever 41 is provided, and the rotation of the coupling shaft part 13 of the wheel loader 1, 101, 201 is input to the base member 43 via the transmission mechanism 10. Therefore, a counterforce can be applied to the operation of the joystick lever 41 according to the rotating state of the coupling shaft part 13 of the wheel loader 1, 101, 201.

As described above, since the counterforce can be generated in the steering device 22, 122, 222, further by transmitting the information regarding the rotation of the joystick lever 41 to the electromagnetic pilot valve 33 electrically, it is not necessary to connect between the electromagnetic pilot valve 33 and the joystick lever 41 with a mechanical transmission mechanism, and it is possible to improve the degree of freedom in layout.

Further, when the pilot valve hits the stroke end stop part by the operation of the joystick lever, a large force is applied to the link mechanism, and therefore it is necessary to make the link mechanism sturdy, and the layout of the link mechanism is restricted. However, since it is not necessary to connect the joystick lever 41 and the electromagnetic pilot valve 33 with a mechanical transmission mechanism as described above, it is possible to improve the degree of freedom in layout.

(2)

The steering device 22 or 222 of the first or third embodiment have the lever angle sensor 46 and the vehicle body frame angle sensor 47. The lever angle sensor 46 detects the actual lever angle θi_real of the joystick lever 41 with respect to the support part 42 as a detection value θi_detect. The vehicle body frame angle sensor 47 detects the actual vehicle body frame angle θs_real of the coupling shaft part 13 of the wheel loader 1 as a detection value θs_detect.

This makes it possible to calculate the difference angle θdiff from the target angle θtarget calculated from the detection value θi_detect of the lever angle and the actual steering angle θactual calculated from the detection value θs_detect of the vehicle body frame angle and to rotate the coupling shaft part 13 of the wheel loader 1 on the basis of the difference angle θdiff.

(3)

The steering device 122 of the second embodiment further has the lever/vehicle body frame difference angle sensor 146. The lever/vehicle body frame difference angle sensor 146 detects an actual relative angle θr_real of the joystick lever 41 with respect to the base member 43 as a detection value θr_detect.

Here, since the actual base angle θb_real of the base member 43 with respect to the support part 42 corresponds to the actual vehicle body frame angle θs_real of the vehicle by the transmission mechanism 10 including the link, the detection value θr_detect of the rotation angle of the joystick lever 41 with respect to the base member 43 corresponds to a difference angle θdiff between the rotation angle of the joystick lever 41 and the vehicle body frame angle, and it is possible to rotate the coupling shaft part 13 of the wheel loader 101 based on the difference angle θdiff.

(4)

The steering system 8 or 208 of the first or third embodiments has the steering device 22 or 222, the adjusting mechanism 21, the vehicle speed sensor 24, and the controller 23. The adjusting mechanism 21 adjusts the drive output of the steering cylinders 9a and 9b that rotates the coupling shaft part 13 of the wheel loader 1 or 201. The vehicle speed sensor 24 detects the traveling speed V_real of the wheel loader 1 or 201 as a traveling speed detection value V_detect. The controller 23 gives a command to the adjusting mechanism 21 based on the detection value θi_detect of the rotation angle by the lever angle sensor 46, the detection value θs_detect of the rotation angle by the vehicle body frame angle sensor 47, and the detection value V_detect of the traveling speed by the vehicle speed sensor 24.

Thereby, the difference angle θdiff between the target angle by the joystick lever 41 and the actual steering angle can be detected from the actual vehicle body frame angle θs_real of the wheel loader 1 or 201 and the actual lever angle θi_real of the joystick lever 41, and it is possible to rotate the coupling shaft part 13 of the wheel loader 1, or 201 based on the difference angle θdiff.

(5)

The steering system 108 of the second embodiment has the steering device 122, the adjusting mechanism 21, the vehicle speed sensor 24, and the controller 123. The adjusting mechanism 21 adjusts the drive output of the steering cylinders 9a and 9b that rotate the coupling shaft part 13 of the wheel loader 1. The vehicle speed sensor 24 detects the traveling speed V_real of the wheel loader 1 as a detection value V_detect of the traveling speed. The controller 123 gives a command to the adjusting mechanism 21 based on the detection value θr_detect of the rotation angle by the lever/vehicle body frame difference angle sensor 146 and the detection value V_detect of the traveling speed by the vehicle speed sensor 24.

Here, since the actual base angle θb_real of the base member 43 with respect to the support part 42 corresponds to the actual vehicle body frame angle θs_real of the wheel loader 1 or 101, the detection value θr_detect of the rotation angle of the joystick lever 41 with respect to the base member 43 corresponds to the difference angle θdiff, and it is possible to rotate the coupling shaft part 13 of the wheel loader 101 based on the difference angle.

(6)

The steering device 22, 122, or 222 of the first, the second, or the third embodiment further has the restriction part 48, or 248. The restriction part 48 or 248 restrict the rotation of the joystick lever 41 when the angle of the joystick lever 41 with respect to the base member 43 reaches a predetermined angle.

Thus, for example, within the predetermined angle ranges θ1 to θ1', or θ3 to θ5, only the counterforce by the biasing member 44 is applied to the operation of the joystick lever 41, and when reaching the predetermined angles θ1, θ1', θ3, and θ5, the stronger counterforce is applied to the operation of the joystick lever 41. Therefore, it is possible for the operator to feel the operation range of the joystick lever 41. It is possible for the operator to feel the so-called catch-up angle.

(7)

In the steering system 208 of the third embodiment, the restriction part 248 has the first stopper 71 and the second stopper 72, the stopper angle sensor 61, and the electric motor 78. The first stopper 71 and the second stopper 72 are movable, and the joystick lever 41 comes into contact with the first stopper 71 or the second stopper 72 when reaching the predetermined angles θ3 or θ5. The stopper angle sensor 61 detects the position of the first stopper 71. The electric motor 78 drives the first stopper 71 and the second stopper 72.

Thereby, the angle for restricting the joystick lever 41 can be changed, and it is possible to change the catch-up angle of the lever freely.

(8)

The steering system 208 of the third embodiment has the steering device 222, the vehicle speed sensor 64, and the controller 63. The vehicle speed sensor 64 detects the speed of the wheel loader 201. The controller 63 gives the command to the electric motor 78 based on changes the detection value V_detect by the vehicle speed sensor 64 to change the positions of the first stopper 71 and the second stopper 72 and change the predetermined angle.

Thereby, it is possible to change the catch-up angle of the joystick lever 41 based on the traveling speed of the wheel loader 1. For example, when the vehicle speed is fast, by setting the catch-up angle range to be narrow, so that the rotation range until the operator feels the catch-up is narrowed, and it is possible to improve high-speed stability. Further, when the vehicle speed is low, the range of the catch-up angle is set to be wide, so that the rotation range until the operator feels the catch-up is widened, and it is possible to improve the operability.

(9)

The wheel loader 1, 101, or 201 according to the first, the second, or the third embodiment has a rear frame 12, a front frame 11, steering cylinders 9a, 9b, and a transmission mechanism 10 including a link. The rear frame 12 is provided with the steering device 22, 122, or 222. The front frame 11 is rotatably coupled to the rear frame 12. The steering cylinders 9a and 9b drive the front frame 11 with respect to the rear frame 12. The transmission mechanism 10 includes a link, is connected to the transmission mechanism connecting part 45, and transmits the rotation of the front frame 11 with respect to the rear frame 12 to the base member 43.

Accordingly, in the articulated wheel loader 1, the base member 43 can be rotated to the actual base angle θb_real according to the actual vehicle body frame angle θs_real of the wheel loader 1 via the transmission mechanism 10 including the link. Therefore, the counterforce corresponding to the difference angle θdiff between the target angle by the joystick lever 41 and the actual steering angle can be applied to the joystick lever 41.

(10)

The steering device 222 of the third embodiment is a steering device that operates the wheel loader 201, and has the support part 42, the base member 43, the joystick lever 41, the biasing member 44, and the transmission mechanism connecting part 45, and the restriction part 248. The base member 43 is rotatably supported by the support part 42. The joystick lever 41 is rotatably supported by the support part 42 or the base member 43. The biasing member 44 is interposed between the joystick lever 41 and the base member 43 and biases the joystick lever 41 to the base reference position 43b with respect to the base member 43. The transmission mechanism connecting part 45 is connected to the transmission mechanism 10 that transmits the rotation based on the rotation angle of the coupling shaft part 13 of the wheel loader 1 to the base member 43. The restriction part 248 restricts the rotation of the joystick lever 41 when the angle of the joystick lever 41 with respect to the base member 43 reaches the predetermined angle. The restriction part 248 has the first stopper 71 and the second stopper 72, the stopper angle sensor 61, and the electric motor 78. The first stopper 71 and the second stopper 72 are movable, and the joystick lever 41 comes into contact with the first stopper 71 or the second stopper 72 when reaching the predetermined angle. The stopper angle sensor 61 detects the positions of the first stopper 71 and the second stopper 72. The electric motor 78 drives the first stopper 71 and the second stopper 72.

Thus, for example, within the predetermined angle range θ3 to θ5, only the counterforce by the biasing member 44 is applied to the operation of the joystick lever 41, and when the predetermined angles θ3 and θ5 are reached, the stronger counterforce is applied to the operation of the joystick lever 41. Therefore, it is possible for the operator to feel the operation range of the joystick lever 41. Furthermore, it is possible to change the angle range. That is, it is possible to change the catch-up angle freely.

(11)

The steering device 22 of the first embodiment has a damper 411. The damper 411 is interposed between the joystick lever 41 and the support part 42 or the base member 43, and gives a damping force to the joystick lever 41.

This makes it possible to apply a counterforce in a resisting direction to a sudden operation of the joystick lever 41 in addition to the counterforce of the biasing member 44, and the operator can feel the sudden operation.

(12)

The steering device 22 of the first embodiment has a friction 412. The friction 412 is interposed between the joystick lever 41 and the support part 42 or the base member 43, and gives frictional resistance to the joystick lever 41.

As a result, the joystick lever 41 can be given a property of holding its position so that the operator can hold the position of the joystick lever 41 without continuously applying a large force after rotating the joystick lever 41 and stopping the joystick lever 41. Therefore, it is effective in reducing operator fatigue.

(13)

The wheel loader 1, 101, or 201 of the first, the second, or the third embodiment has the rear frame 12, the front frame 11, steering cylinders 9a and 9b, the support part 42, the base member 43, the joystick lever 41, and the transmission mechanism 10, the controller 23 or 123, and the hydraulic valve 31. The front frame 11 rotates with respect to the rear frame 12. The steering cylinders 9a and 9b rotate the front frame 11 with respect to the rear frame 12. The base member 43 is rotatably supported by the support part 42. The joystick lever 41 is rotatably supported by the base member 43 or the support part 42 with respect to the base member 43. The transmission mechanism 10 includes a link, is connected to the base member 43, transmits the rotation state of the front frame 11 with respect to the rear frame 12 to the base member 43, and converts the rotation state of the front frame 11 with respect to the rear frame 12 to the rotation state of the base member 43 with respect to the support part 42. The controller 23 or 123 output an electromagnetic pilot valve control current output i for adjusting the steering cylinders 9a and 9b based on the rotating operation of the joystick lever 41 with respect to the base member 43. The hydraulic valve 31 adjusts the operation of the steering cylinders 9a and 9b by the electromagnetic pilot valve control current output i output from the controller 23 or 123.

By transmitting the information regarding the rotation of the joystick lever 41 to the hydraulic valve 31 via an electric signal, it is not necessary to mechanically connect all the transmissions between the joystick lever 41 and the hydraulic valve 31, and it is possible to improve the degree of freedom in the layout.

(14)

The wheel loader 101 of the second embodiment further has the lever/vehicle body frame difference angle sensor 146. The lever/vehicle body frame difference angle sensor 146 detects the actual relative angle θr_real of the joystick lever 41 with respect to the base member 43 as the detection value θr_detect. The controller 123 outputs the electromagnetic pilot valve control current output i based on the detection value of the relative angle by the lever/vehicle body frame difference angle sensor 146.

Thereby, it is possible to perform the rotating operation based on the detection value θr_detect of the relative angle.

(15)

The wheel loader 1 or 201 of the first or third embodiment further has the lever angle sensor 46 and the vehicle body frame angle sensor 47. The controller 23 or 123 outputs the electromagnetic pilot valve control current output i based on the target angle θtarget corresponding to the detection value θi_detect of the lever angle by the lever angle sensor 46 and the actual steering angle θactual corresponding to the detection value θs_detect of the vehicle body frame angle by the vehicle body frame angle sensor 47.

Accordingly, it is possible to perform the rotating operation based on the detection value θi_detect of the lever angle and the detection value θs_detect of the vehicle body frame angle.

(16)

The wheel loader 1, 101, or 201 of the first, the second, or the third embodiment further has the electromagnetic pilot valve 33. The electromagnetic pilot valve control current output i is input to the electromagnetic pilot valve 33 receives, and the electromagnetic pilot valve 33 adjusts the pilot pressure or the pilot flow rate supplied to the hydraulic valve 31.

By electrically transmitting information about the rotation of the joystick lever 41 to the electromagnetic pilot valve 33, it is not necessary to connect the joystick lever 41 and the electromagnetic pilot valve 33 by a mechanical transmission mechanism, and it is possible to improve the degree of freedom in layout.

Other Embodiments

While an embodiment of the present disclosure has been explained above, the present disclosure is not limited to the above embodiment and various changes are possible within the scope of the present disclosure.

(A)

In addition, the movable restriction part 248 as in the third embodiment may be applied to the steering system 108 of the second embodiment.

(B)

In the third embodiment, the rotation angle of the base member 43 is rotated by the transmission mechanism 10 including the link to the angle corresponding to the body frame angle, but the transmission mechanism 10 including the link is not provided, the base member 43 may be rotated by using an actuator such as an electric motor. In this case, the controller 23 may give a command by a wired or wireless to the actuator based on the detection value of the vehicle body frame angle sensor 47.

(C)

Figure 19:
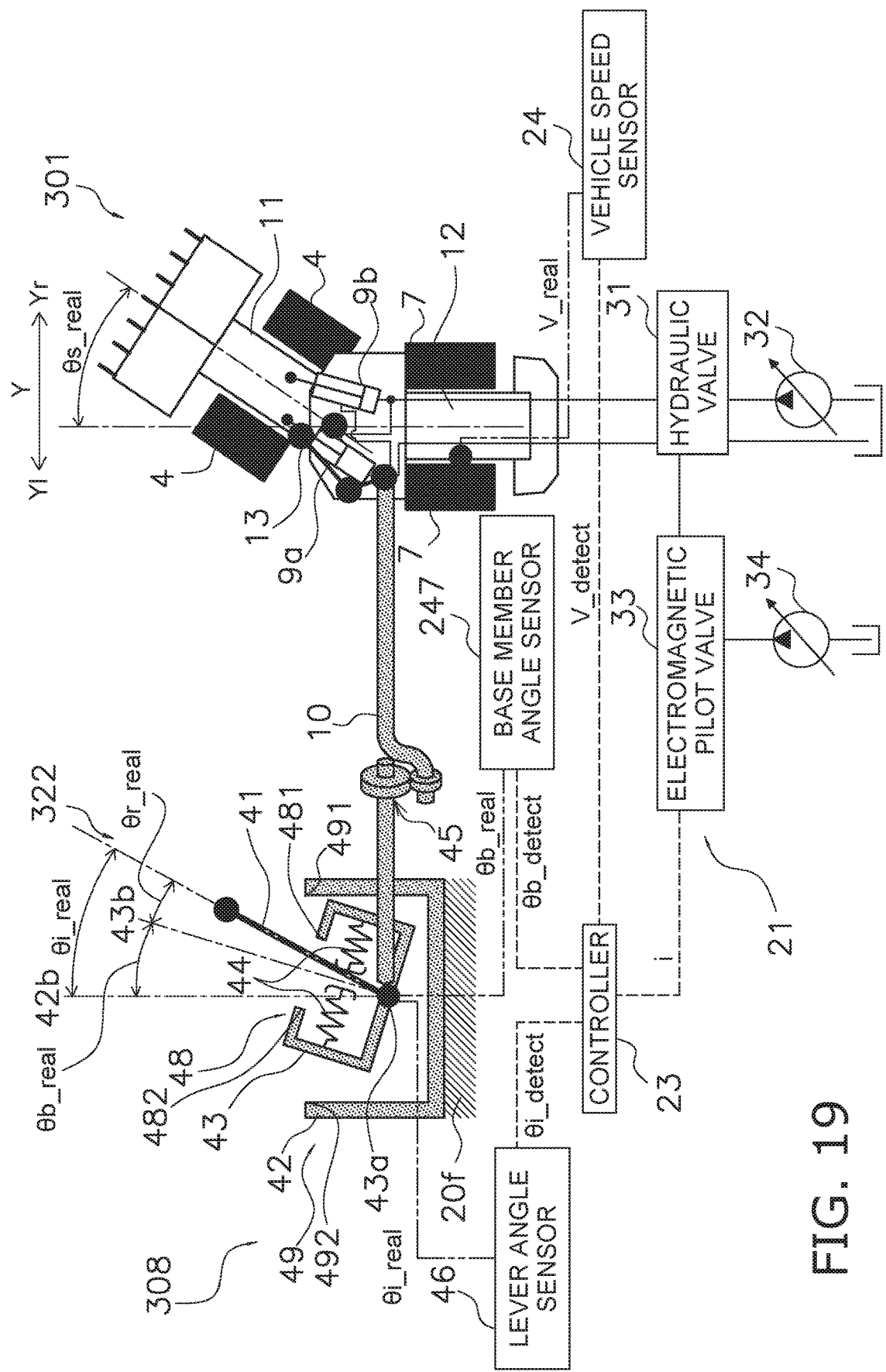
FIG. 19 is a configuration view illustrating a steering system in a modified example of the embodiment according to the invention.

The wheel loader 1 or 201 of the above-described first or third embodiment is provided with the vehicle body frame angle sensor 47 that detects the vehicle body frame angle θs_real, but instead of the vehicle body frame angle sensor 47, a base member angle sensor 247 that detects the rotation angle of the base member 43 may be provided. A wheel loader 301 having such a configuration is illustrated in FIG. 19. The steering device 222 in a steering system 308 of the wheel loader 301 has the base member angle sensor 247 instead of the vehicle body frame angle sensor 47. The base member angle sensor 247 is a potentiometer or the like and detects the rotation angle of the base member 43 with respect to the support part 42.

With the transmission mechanism 10, the vehicle body frame angle θs_real and the base angle θb_real, which is the rotation angle of the base member with respect to the support part 42, have a corresponding positional relationship, so the vehicle body frame angle can be detected by detecting the rotation angle of the base member 43 with respect to the support part 42.

In this case, the detection value θb_detect of the rotation angle of the base member 43 detected by the base member angle sensor 247 is transmitted to the controller 23 as a detection signal. The detection value θb_detect of the rotation angle of the base member 43 corresponds to an example of a fourth detection value.

The controller 23 performs control using a block diagram in which the detection value θs_detect of the vehicle body frame angle in FIG. 7 is replaced with the detection value θb_detect of the rotation angle of the base member 43. Here, since the actual base angle θb_real of the base member 43 corresponds to the actual vehicle body frame angle θs_real by the transmission mechanism 10, by using the map M2 corresponding to the reduction ratio by the transmission mechanism 10, the actual vehicle body frame angle θactual can be calculated. The steering cylinders 9a and 9b can be controlled based on the vehicle body frame angle θactual in the same manner as in the first embodiment.

As described above, the controller 23 outputs the electromagnetic pilot valve control current output i based on the target angle θtarget corresponding to the detection value θi_detect of the lever angle by the lever angle sensor 46 and the actual vehicle body frame angle θactual corresponding to the detection value θb_detect of the rotation angle of the base member 43 by the base member angle sensor 247, so that the hydraulic valve 31 adjusts the operation of the steering cylinders 9a and 9b, and the rotating operation is performed.

(D)

In the transmission mechanism 10 of the first to third embodiments, the configuration using the universal joints 53 and 55 as the shape of the link is described as an example, but the configuration is not limited to such a configuration, and a configuration using a cable such as a push-pull cable instead of the universal joint may be used.

(E)

In the first to third embodiments, the amount of oil supplied from the hydraulic valve 31 to the steering cylinders 9a and 9b is controlled according to the pilot pressure input from the electromagnetic pilot valve 33. The oil from the electromagnetic pilot valve 33 may be directly supplied to the steering cylinders 9a and 9b without passing through the hydraulic valve 31. That is, an electromagnetic main valve may be used instead of the electromagnetic pilot valve 33.

(F)

While the range of the base member angle and the lever angle (angle scale) is narrower than the range of the body frame angle (angle scale) in the above embodiment, the range of the base member angle and the lever angle (angle scale) may be the same as the range of the body frame angle or larger than the range of the vehicle body frame angle.

However, it is preferable that the range of the base plate angle and the lever angle (angle scale) is narrower than the range of the vehicle body frame angle (angle scale) because the operation range of the operator is narrowed, which is easier to operate.

(G)

While the wheel loader 1 is used in the explanations as an example of the work vehicle in the above embodiments, an articulated type dump truck, a motor grader, or the like may be used.

(H)

While only the joystick lever 41 is described in the first to third embodiments, a steering wheel may be provided. A signal generated by the rotation of the steering wheel is input to the controller 23, and the electromagnetic pilot valve 33 is operated based on the rotation.

(I)

While the controller 23 and the controller 63 are provided separately in the third embodiment, they may be the same. While the vehicle speed sensor 24 and the vehicle speed sensor 64 are provided separately, they may be the same.

The steering device of the present invention has the effect of improving the degree of freedom in the layout and is useful as a wheel loader or the like.

What is claimed is:

1. A steering device for operating a work vehicle, the steering device comprising:
   a support part fixed to a console box disposed on a side of an operator seat of the work vehicle;
   a base member rotatably supported by the support part;
   a lever rotatably supported by the support part or the base member;
   a biasing member interposed between the lever and the base member, the biasing member being configured to bias the lever to a predetermined position with respect to the base member; and
   a transmission mechanism connecting part configured to be connected to a transmission mechanism including a link, the transmission mechanism being configured to transmit rotation based on a rotation angle of a coupling shaft of the work vehicle to the base member.

2. The steering device according to claim 1, further comprising:
   a first lever angle sensor configured to detect a rotation angle of the lever with respect to the support part, and
   a vehicle body steering angle sensor configured to detect the rotation angle of the coupling shaft of the work vehicle.

3. A steering system including the steering device according to claim 2, the steering system further comprising:
   an adjusting mechanism configured to adjust drive output of an actuator configured to rotate the coupling shaft of the work vehicle;
   a traveling speed detection part configured to detect a traveling speed of the work vehicle; and
   a controller configured to give a command to the adjusting mechanism based on
      a first detection value by the first lever angle sensor,
      a second detection value by the vehicle body steering angle sensor, and
      the traveling speed by the traveling speed detection part.

4. The steering device according to claim 1, further comprising:
   a second lever angle sensor configured to detect a rotation angle of the lever with respect to the base member.

5. A steering system including the steering device according to claim 4, the steering system further comprising:
   an adjusting mechanism configured to adjust drive output of an actuator configured to rotate the coupling shaft of the work vehicle;
   a traveling speed detection part configured to detect a traveling speed of the work vehicle; and
   a controller configured to give a command to the adjusting mechanism based on
      a third detection value by the second lever angle sensor and
      the traveling speed by the traveling speed detection part.

6. The steering device according to claim 1, further comprising:
   a restriction part configured to restrict rotation of the lever when an angle of the lever with respect to the base member reaches a predetermined angle.

7. The steering device according to claim 6, wherein the restriction part includes
   a contact part configured to be movable, the lever coming into contact with the contact part when reaching the predetermined angle,
   a position detection part configured to detect a position of the contact part, and
   a drive part configured to drive the contact part.

8. A steering system including the steering device according to claim 7, the steering system further comprising:
   a traveling speed detection part configured to detect a traveling speed of the work vehicle; and
   a controller configured to give a command to the drive part based on a detection value by the traveling speed detection part to change the position of the contact part and change the predetermined angle.

9. A work vehicle including the steering device according to claim 1, the work vehicle further comprising:
   a first frame, the steering device being arranged in the first frame;
   a second frame rotatably coupled to the first frame;
   an actuator configured to drive the second frame with respect to the first frame; and
   the transmission mechanism including the link, the transmission mechanism being connected to the transmission mechanism connecting part, the transmission mechanism being configured to transmit rotation based on the rotation angle of the second frame with respect to the first frame to the base member.

10. The steering device according to claim 1, further comprising:
    a damping member interposed between the lever and the support part or the base member, the damping member being configured to give a damping force to the lever.

11. The steering device according to claim 1, further comprising:
    a friction member interposed between the lever and the support portion or the base member, the friction member giving a frictional resistance force to the lever.

12. The work vehicle according to claim 1, further comprising:
    a lever angle sensor configured to detect a rotation angle of the lever with respect to the support part; and
    a vehicle body steering angle sensor configured to detect a rotation angle of a coupling shaft of the work vehicle,
    the controller being further configured to output the adjustment signal based on
       a value corresponding to a first detection value by the first lever angle sensor and a value corresponding to a second detection value by the vehicle body steering angle sensor.

13. A steering device for operating a work vehicle, the steering device comprising:
a support part;
a base member rotatably supported by the support part;
a lever rotatably supported by the support part or the base member;
a biasing member interposed between the lever and the base member, the biasing member being configured to bias the lever to a predetermined position with respect to the base member;
a transmission mechanism connecting part configured to be connected to a transmission mechanism configured to transmit rotation based on a rotation angle of a coupling shaft of the work vehicle to the base member; and
a restriction part configured to restrict rotation of the lever when an angle of the lever with respect to the base member reaches a predetermined angle, the restriction part including
a contact part configured to be movable, the lever coming into contact with the contact part when reaching the predetermined angle,
a position detection part configured to detect a position of the contact part, and
a drive part configured to drive the contact part.

14. The steering device according to claim 13, further comprising:
a damping member interposed between the lever and the support part or the base member, the damping member being configured to give a damping force to the lever.

15. The steering device according to claim 13, further comprising:
a friction member interposed between the lever and the support portion or the base member, the friction member giving a frictional resistance force to the lever.

16. A work vehicle comprising:
a first frame;
a second frame configured to rotate with respect to the first frame;
a hydraulic cylinder configured to drive the second frame with respect to the first frame;
a console box disposed on a side of an operator seat of the work vehicle;
a support part fixed to the console box;
a base member rotatably supported with respect to the support part;
a lever supported by the support part or the base member so as to be rotatable with respect to the base member;
a transmission mechanism including a link, the transmission mechanism being connected to the base member, the transmission mechanism being configured to transmit a rotation state of the second frame with respect to the first frame to the base member, the transmission mechanism being configured to convert the rotation state of the second frame with respect to the first frame to a rotation state of the base member with respect to the support part;
a controller configured to output an adjustment signal for the hydraulic cylinder based on a rotating operation of the lever with respect to the base member; and
an adjustment part configured to adjust an operation of hydraulic cylinder by the adjustment signal output from the controller.

17. The work vehicle according to claim 16, further comprising:
a lever angle sensor configured to detect a rotation angle of the lever with respect to the base member,
the controller being further configured to output the adjustment signal based on a value corresponding to a third detection value by the second lever angle sensor.

18. The work vehicle according to claim 17, further comprising:
an electromagnetic pilot valve configured to adjust a pilot pressure or pilot flow rate to be supplied to the adjustment part.

19. The work vehicle according to claim 16, further comprising:
a lever angle sensor configured to detect a rotation angle of the lever with respect to the support part; and
a base member angle sensor configured to detect a rotation angle of the base member with respect to the support part,
the controller being further configured to output the adjustment signal based on
a value corresponding to a first detection value by the first lever angle sensor and
a value corresponding to a fourth detection value by the base member angle sensor.

20. The work vehicle according to claim 16, wherein
the adjustment part is a hydraulic valve configured to adjust a flow rate of oil supplied to the hydraulic cylinder.

* * * * *